US 12,539,575 B2

(12) United States Patent
Miyazawa et al.

(10) Patent No.: US 12,539,575 B2
(45) Date of Patent: Feb. 3, 2026

(54) WORK MACHINE

(71) Applicant: Koki Holdings Co., Ltd., Tokyo (JP)

(72) Inventors: Ken Miyazawa, Ibaraki (JP); Ryo Suzuki, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 429 days.

(21) Appl. No.: 17/920,803

(22) PCT Filed: Mar. 31, 2021

(86) PCT No.: PCT/JP2021/013895
§ 371 (c)(1),
(2) Date: Oct. 24, 2022

(87) PCT Pub. No.: WO2021/215214
PCT Pub. Date: Oct. 28, 2021

(65) Prior Publication Data
US 2023/0166378 A1    Jun. 1, 2023

(30) Foreign Application Priority Data

Apr. 24, 2020 (JP) ................................ 2020-077100
Apr. 24, 2020 (JP) ................................ 2020-077101

(51) Int. Cl.
*B25F 5/02*       (2006.01)
*B24B 23/02*     (2006.01)

(52) U.S. Cl.
CPC ............. *B24B 23/02* (2013.01); *B25F 5/02* (2013.01)

(58) Field of Classification Search
CPC .......... B24B 23/02; B24B 23/028; B25F 5/02

USPC ........ 173/81, 90, 140–141, 162.1, 197, 198, 173/213, 168–171
See application file for complete search history.

(56) References Cited

U.S. PATENT DOCUMENTS

| | | | | |
|---|---|---|---|---|
| 1,502,169 A | * | 7/1924 | Bennett ................. | B23B 45/001 200/332.2 |
| 4,576,241 A | * | 3/1986 | Emonet ................ | B25D 17/043 173/162.2 |
| 5,060,771 A | * | 10/1991 | Robinson .............. | B25B 23/145 192/56.54 |

(Continued)

FOREIGN PATENT DOCUMENTS

| | | | | |
|---|---|---|---|---|
| CA | 2334293 C | * | 12/2005 | .............. B25F 5/008 |
| CN | 1157202 | | 8/1997 | |

(Continued)

OTHER PUBLICATIONS

"Search Report of Europe Counterpart Application", issued on Oct. 5, 2023, p. 1-p. 7.

(Continued)

*Primary Examiner* — Robert F Long
(74) *Attorney, Agent, or Firm* — JCIPRNET

(57) ABSTRACT

The present invention addresses the issue of improving an assembly property. In a grinder, a paddle lever is rotatably connected to a rear housing. In addition, a rotating shaft that is rotatably supported by the rear housing is formed with the paddle lever, and a stopper part for regulating the rotation range of the paddle lever is formed with the rear housing. Furthermore, the rear housing and the paddle lever are each constituted by a single member. Through this, the assembly property of the grinder can be improved.

5 Claims, 11 Drawing Sheets

(56) References Cited

U.S. PATENT DOCUMENTS

| | | | | |
|---|---|---|---|---|
| 5,339,572 | A * | 8/1994 | Eicher | B23D 45/16 |
| | | | | 451/358 |
| 5,681,214 | A * | 10/1997 | Kleider | B24B 23/028 |
| | | | | 451/344 |
| 6,120,362 | A * | 9/2000 | Etter | B25F 5/02 |
| | | | | 451/354 |
| 6,293,859 | B1 * | 9/2001 | Fink | B25F 5/02 |
| | | | | 451/344 |
| 9,978,541 | B2 * | 5/2018 | Mizutani | B25F 5/00 |
| 10,410,811 | B2 * | 9/2019 | Hanai | H01H 25/00 |
| 2004/0226969 | A1 * | 11/2004 | Shew | G01F 11/029 |
| | | | | 222/256 |
| 2005/0166741 | A1 * | 8/2005 | Kopras | B25F 5/021 |
| | | | | 83/745 |
| 2011/0220381 | A1 * | 9/2011 | Friese | B25F 5/02 |
| | | | | 173/217 |
| 2011/0227429 | A1 | 9/2011 | Takeda et al. | |
| 2012/0298391 | A1 * | 11/2012 | Kakiuchi | B23Q 11/0046 |
| | | | | 173/217 |
| 2015/0280532 | A1 * | 10/2015 | Mizutani | H02K 7/14 |
| | | | | 310/50 |
| 2017/0136614 | A1 * | 5/2017 | Takeda | B24B 23/02 |
| 2017/0250038 | A1 * | 8/2017 | Esenwein | B25F 5/00 |
| 2018/0117728 | A1 | 5/2018 | Kawakami et al. | |
| 2019/0001479 | A1 | 1/2019 | Yoshinari et al. | |
| 2020/0037839 | A1 * | 2/2020 | Iwakami | A47L 9/2863 |
| 2020/0061764 | A1 * | 2/2020 | Furusawa | B23Q 11/0046 |
| 2020/0331138 | A1 * | 10/2020 | Ejiri | B24B 23/02 |
| 2020/0361057 | A1 * | 11/2020 | Shibata | B24B 41/007 |
| 2020/0391369 | A1 * | 12/2020 | Furusawa | B25D 11/12 |
| 2022/0118596 | A1 * | 4/2022 | Hatakeyama | B25F 5/02 |
| 2023/0256581 | A1 * | 8/2023 | Mizutani | B25F 5/02 |
| | | | | 173/46 |
| 2024/0050093 | A1 * | 2/2024 | Marecki | A61B 17/07207 |
| 2024/0313611 | A1 * | 9/2024 | Duncan | B24B 41/007 |
| 2024/0322654 | A1 * | 9/2024 | Stritch | A61B 17/14 |

FOREIGN PATENT DOCUMENTS

| | | | |
|---|---|---|---|
| CN | 102171005 | 8/2011 | |
| CN | 102765033 | 11/2012 | |
| CN | 104972437 | 10/2015 | |
| CN | 108000307 | 5/2018 | |
| CN | 110786770 | 2/2020 | |
| EP | 2361732 | 8/2011 | |
| JP | S61144479 | 7/1986 | |
| JP | 2010158755 | 7/2010 | |
| JP | 2011143492 | 7/2011 | |
| JP | 2011158043 | 8/2011 | |
| JP | 2011167812 | 9/2011 | |
| JP | 5208775 | 6/2013 | |
| JP | 2016187865 | 11/2016 | |
| JP | 2017017770 | 1/2017 | |
| JP | 2018047530 | 3/2018 | |
| JP | 2018075703 | 5/2018 | |
| WO | WO-2004075728 A2 * | 9/2004 | A61B 10/0275 |
| WO | 2010026963 | 3/2010 | |
| WO | 2019130979 | 7/2019 | |

OTHER PUBLICATIONS

"International Search Report (Form PCT/ISA/210) of PCT/JP2021/013895," mailed on Jun. 8, 2021, with English translation thereof, pp. 1-6.

"Office Action of China Counterpart Application", with English translation thereof, issued on Mar. 6, 2025, pp. 1-15.

"Office Action of China Counterpart Application", issued on Jul. 23, 2025, with English translation thereof, p. 1-p. 12.

* cited by examiner

WORK MACHINE

CROSS-REFERENCE TO RELATED APPLICATION

This application is a 371 application of the International PCT application serial no. PCT/JP2021/013895, filed on Mar. 31, 2021, which claims the priority benefits of Japan Patent Application No. 2020-077100, filed on Apr. 24, 2020, and Japan Patent Application No. 2020-077101, filed on Apr. 24, 2020. The entirety of each of the above-mentioned patent applications is hereby incorporated by reference herein and made a part of this specification.

Technical Field

The disclosure relates to a work machine.

RELATED ART

In the electric grinder (work machine) described in Patent Literature 1 below, a housing that configures the outer shell of the electric grinder includes a gear cover, a motor housing (first housing), and a tail cover (second housing). These housings are disposed side by side in this order in the front-rear direction. Further, a front end of a switch lever (lever) configured as an operating part of the electric grinder is rotatably connected to the motor housing. In addition, the rear end of the switch lever is engaged with the tail cover to limit the rotation range of the switch lever. When the switch lever is operated, the switch lever rotates around the front end, and the switch in the tail cover is pressed by the switch lever. As a result, the motor in the motor housing is driven to operate the electric grinder.

CITATION LIST

Patent Literature

[Patent Literature 1] Japanese Patent Application Laid-Open No. 2011-167812

SUMMARY

Technical Problem

Here, in the electric grinder, the tail cover is divided into left and right parts. Therefore, when the switch lever is assembled to the housing, the front end of the switch lever is connected to the motor housing, and the rear end of the switch lever is engaged with the divided tail cover, and it is necessary to assemble the two-part tail covers and to assemble the assembled tail cover to the motor housing. As a result, assembly of each member becomes complicated in the above electric grinder, and there is room for improvement in productivity in terms of assembly. Another problem is that when the switch is operated by the operation of the switch lever, the internal structure (electrical components) such as wiring may interfere with the operation of the switch lever and hinder the operation of the switch.

In view of the above, the disclosure provides a work machine with an improved assembly property. Further, the disclosure provides a work machine capable of keeping the operation of the switch lever in good condition.

Solution to Problem

A work machine according to one or more embodiments of the disclosure includes: a first housing that accommodates a motor; a second housing that is connected to the first housing and accommodates a switch for turning on and off the motor; a lever that includes a rotating shaft rotatably connected to the second housing and turns on the switch by being rotated from an initial position to an operating position; and a stopper part that is formed with one of the second housing and the lever as a same piece and engages with the other of the second housing and the lever to restrict a rotation range of the lever, and the lever and the second housing are each a single member.

In the work machine according to one or more embodiments of the disclosure, the stopper part extends toward the other of the second housing and the lever, and an engaging part is formed at a tip part of the stopper part, and the other of the second housing and the lever is provided with a hole into which the stopper part is inserted, and the hole is provided with an engaged part that engages with the engaging part in an extending direction of the stopper part.

In the work machine according to one or more embodiments of the disclosure, the stopper part is provided in the second housing, and the hole is provided in the lever.

In the work machine according to one or more embodiments of the disclosure, the lever extends in an axial direction of the motor, and an axial direction of the rotating shaft is an orthogonal direction orthogonal to an extending direction of the lever, and the second housing is provided with a pair of the stopper parts arranged in the orthogonal direction, and the lever is provided with a pair of the holes arranged in the orthogonal direction.

In the work machine according to one or more embodiments of the disclosure, the lever is rotatably provided with an off-lock member; at a locked position of the off-lock member, the off-lock member abuts against the second housing, and a rotation of the lever at the initial position is restricted; the rotation of the lever from the initial position to the operating position is allowed by the off-lock member being rotated to an unlocked position; and the hole and the off-lock member are disposed side by side in the orthogonal direction.

In the work machine according to one or more embodiments of the disclosure, the rotating shaft is fitted into a support hole of the second housing by snap-fitting and is rotatably connected to the second housing, and at least one of the rotating shaft and the second housing is provided with an inclined part that facilitates the snap-fitting.

The work machine according to one or more embodiments of the disclosure further includes a spring that biases the lever in the operating position to the initial position; the lever is provided with a spring locking part for holding the spring and a switch operating part protruding toward the second housing for operating the switch, and at least a part of each of the spring locking part and the switch operating part is located at a same position in an extending direction of the lever.

In the work machine according to one or more embodiments of the disclosure, the switch is held in the first housing, and by connecting the second housing that holds the lever to the first housing that holds the switch, the first housing and the second housing are assembled in a way in which the switch is operable by the lever.

A work machine according to one or more embodiments of the disclosure includes: a first housing that accommodates a motor; a switch supported by the first housing for turning on and off the motor; a lever that includes a rotating shaft rotatably connected to a second housing and turns on the switch by being rotated from an initial position to an operating position; and a stopper part that is formed with one of the second housing as a same piece and the lever and engages with the other of the second housing and the lever to restrict a rotation range of the lever, and the second housing that supports the lever is able to be assembled with the first housing that supports the switch.

Effects of Invention

According to one or more embodiments of the disclosure, the assembly property may be improved.

DESCRIPTION OF THE EMBODIMENTS

Figure 1:
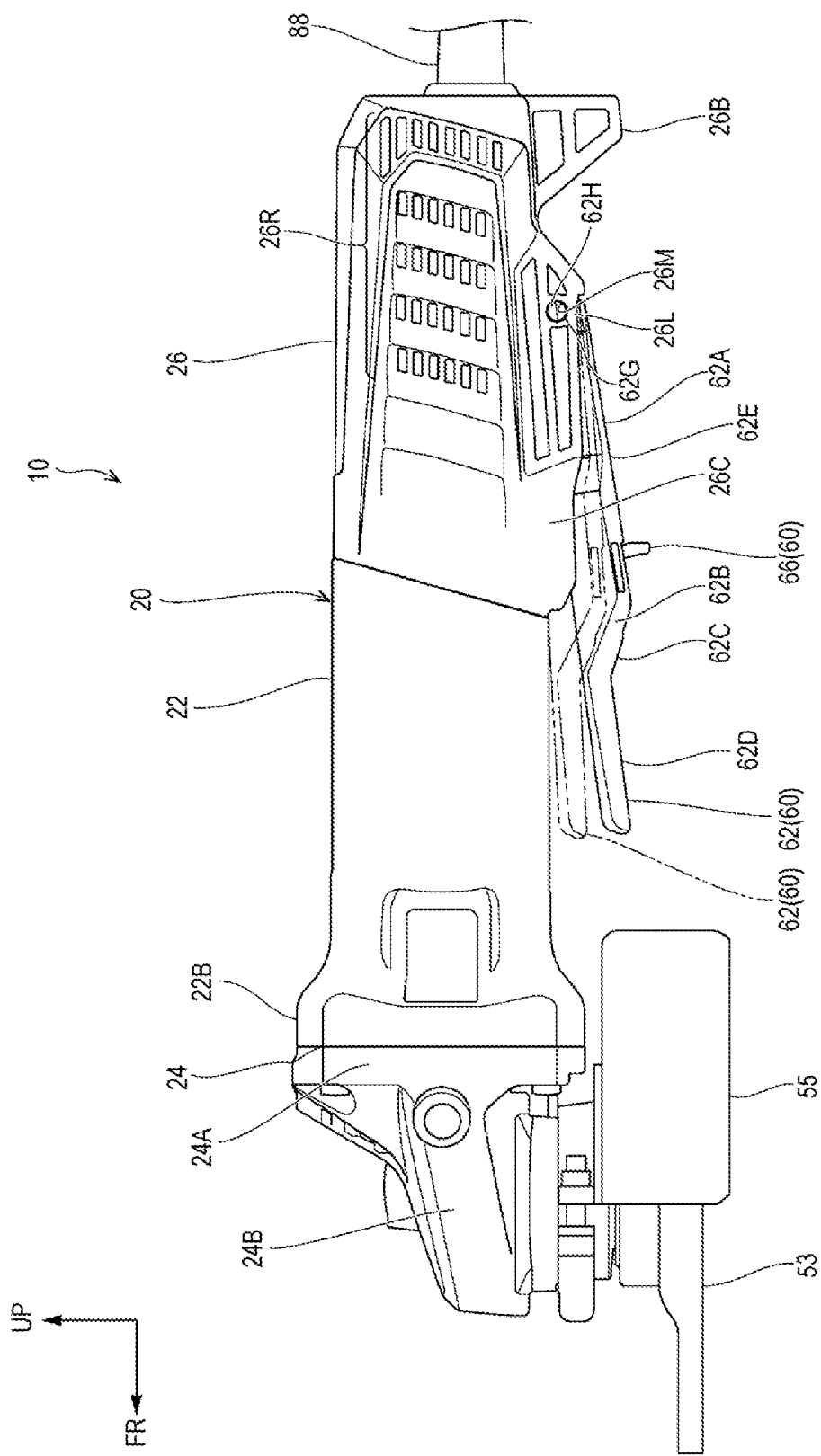
FIG. 1 is a side view of a disc grinder according to this embodiment as viewed from the left side.

A disk grinder 10 (hereinafter simply referred to as the grinder 10) as a work machine according to this embodiment will be described below with reference to the drawings. An arrow UP, an arrow FR, and an arrow RH appropriately shown in the drawings indicate the upper side, the front side, and the right side of the grinder 10, respectively. In the following description, when the up-down, front-rear, and left-right directions are mentioned, they indicate the up-down, front-rear, and left-right directions of the grinder 10, unless otherwise specified. Further, the left-right direction corresponds to the orthogonal direction of the disclosure.

Figure 2:
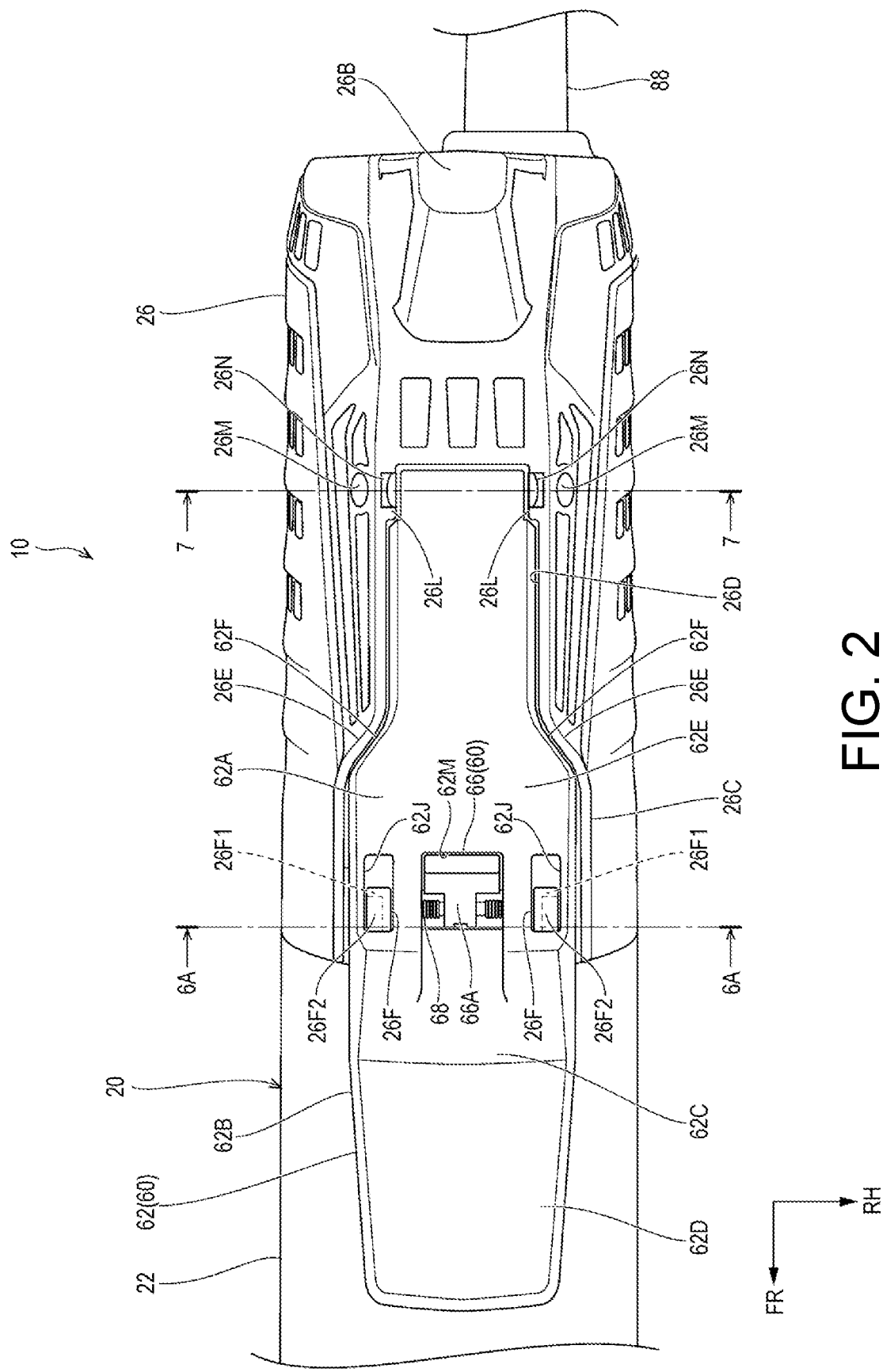
FIG. 2 is a bottom view of the rear part of the disc grinder shown in FIG. 1 as viewed from the lower side.
Figure 3:
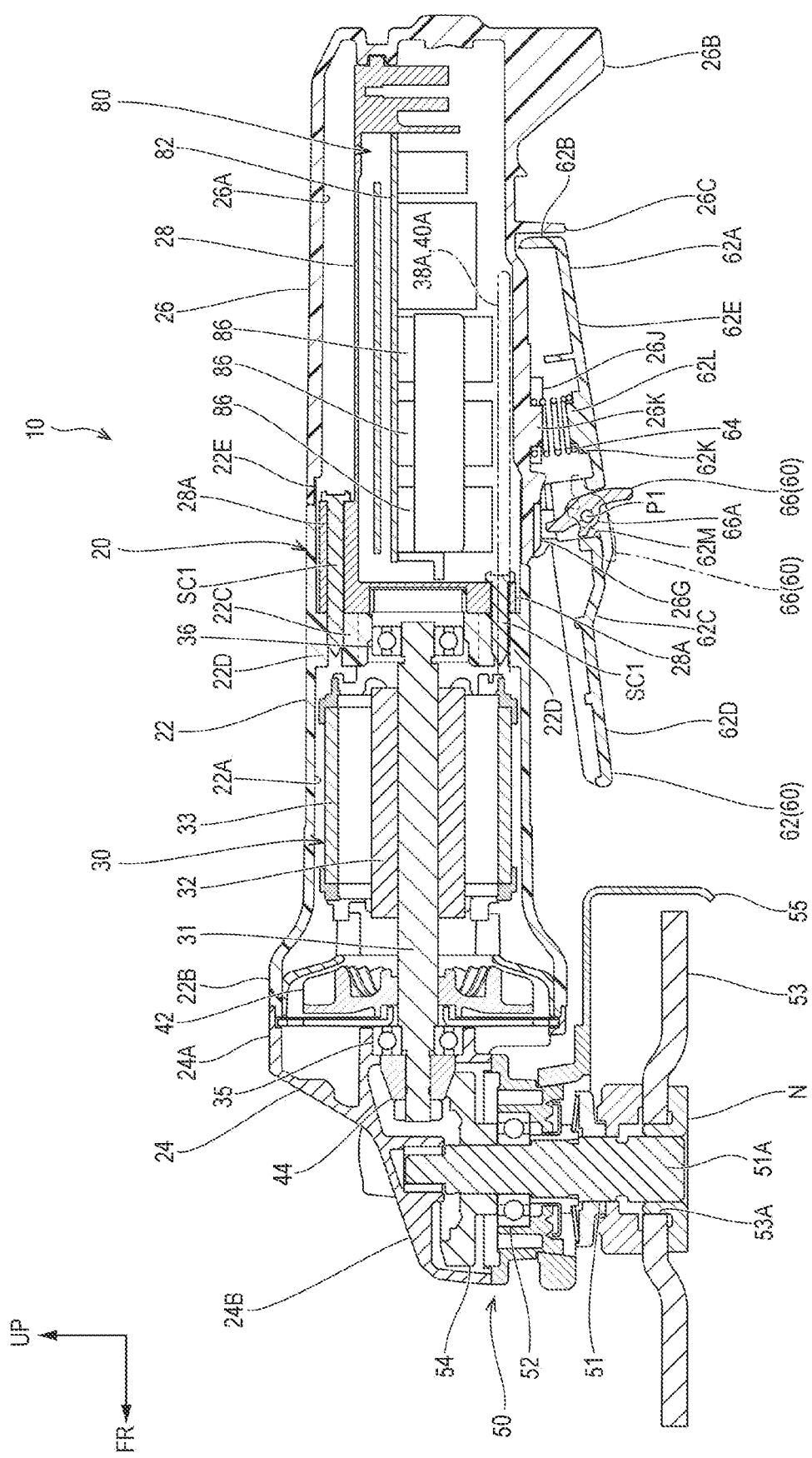
FIG. 3 is a side cross-sectional view showing the inside of the disc grinder shown in FIG. 1 as viewed from the left side.

The grinder 10 is configured as a tool for performing cutting, polishing, or the like on a workpiece. As shown in FIGS. 1 to 3, the grinder 10 includes a housing 20, a motor 30, a transmission mechanism 50, an operating mechanism 60, and a control part 80. Each part of the grinder 10 will be described below.

(Regarding the Housing 20) The housing 20 configures the outer shell of the grinder 10 and is formed in a hollow, substantially columnar shape extending in the front-rear direction as a whole. The housing 20 includes a motor housing 22 as a first housing forming a front-rear intermediate part of the housing 20, a gear housing 24 forming a front end of the housing 20, and a rear housing 26 as a second housing forming a rear end of the housing 20. A board holder 28 for holding a control board 82 of the control part 80 to be described later is provided inside the rear housing 26.

<Regarding the Motor Housing 22> The motor housing 22 is formed in a substantially cylindrical shape with the front-rear direction as the axial direction. The inside of the motor housing 22 is configured as a motor accommodating part 22A for accommodating the motor 30, which will be described later. A front end of the motor housing 22 is formed with an expanded diameter part 22B protruding radially outward, and the expanded diameter part 22B is formed in a substantially rectangular shape when viewed from the front. A fan 42, which will be described later, is accommodated in the expanded diameter part 22B.

A bearing accommodating part 22C for accommodating a second motor bearing 36, which will be described later, is formed inside the rear end of the motor housing 22. The bearing accommodating part 22C is formed in a substantially cylindrical shape with the front-rear direction as the axial direction, and is disposed coaxially with the motor housing 22. The bearing accommodating part 22C is connected to a side wall part of the motor housing 22 by a connecting rib (not shown) provided around the bearing accommodating part 22C. Further, inside the rear end of the motor housing 22, a pair of upper and lower holder fixing parts 22D for fixing the board holder 28, which will be described later, are formed radially outside the bearing accommodating part 22C. The holder fixing part 22D is formed in a substantially cylindrical shape with the front-rear direction as the axial direction, and is connected to the bearing accommodating part 22C and the motor housing 22. Further, a female screw is formed on the inner peripheral part of the holder fixing part 22D.

The rear end of the motor housing 22 is inclined forward toward the lower side in a side view. A stepped part 22E is formed on the outer peripheral part of the rear end of the motor housing 22, and the stepped part 22E descends from the outer peripheral part of the motor housing 22 inward in the radial direction by one step. Further, the stepped part 22E is formed along the entire circumference of the rear end of the motor housing 22.

<Regarding the Gear Housing 24> The gear housing 24 has a base part 24A that configures the rear end of the gear housing 24, and the base part 24A is formed in a substantially rectangular tubular shape corresponding to the expanded diameter part 22B of the motor housing 22. Further, the expanded diameter part 22B is inserted into the base part 24A, and the outer peripheral part of the base part 24A is fixed to the expanded diameter part 22B at a position not shown. Further, the gear housing 24 is formed with an overhanging part 24B that overhangs forward from the base part 24A, and the overhanging part 24B is formed in a substantially triangular shape in a side view and opens to the lower side.

Figure 5:
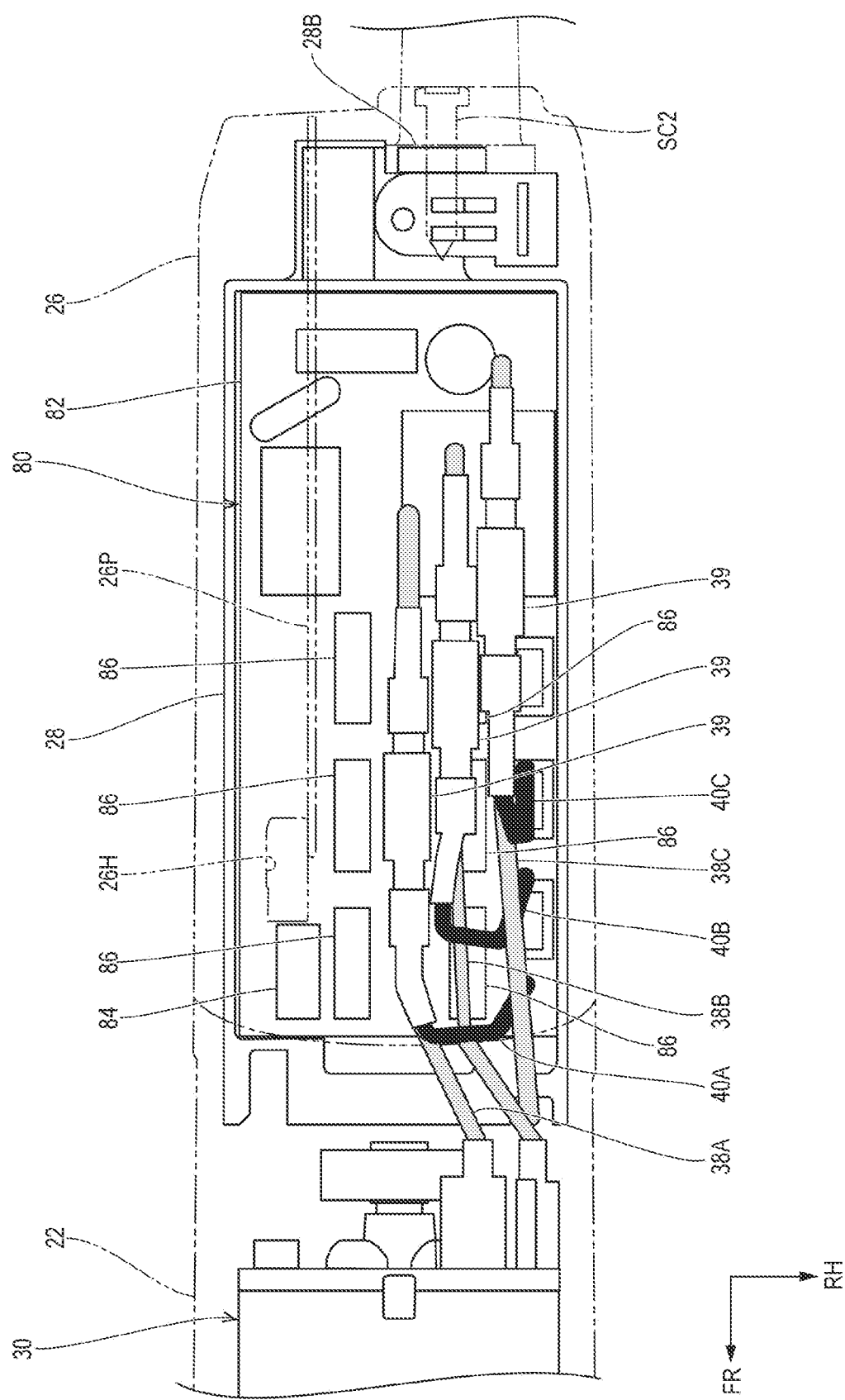
FIG. 5 is a wiring diagram as viewed from the lower side which schematically shows the wiring state of motor-side lead wires and board-side lead wires for connecting the motor and the control board shown in FIG. 3.
Figure 6:
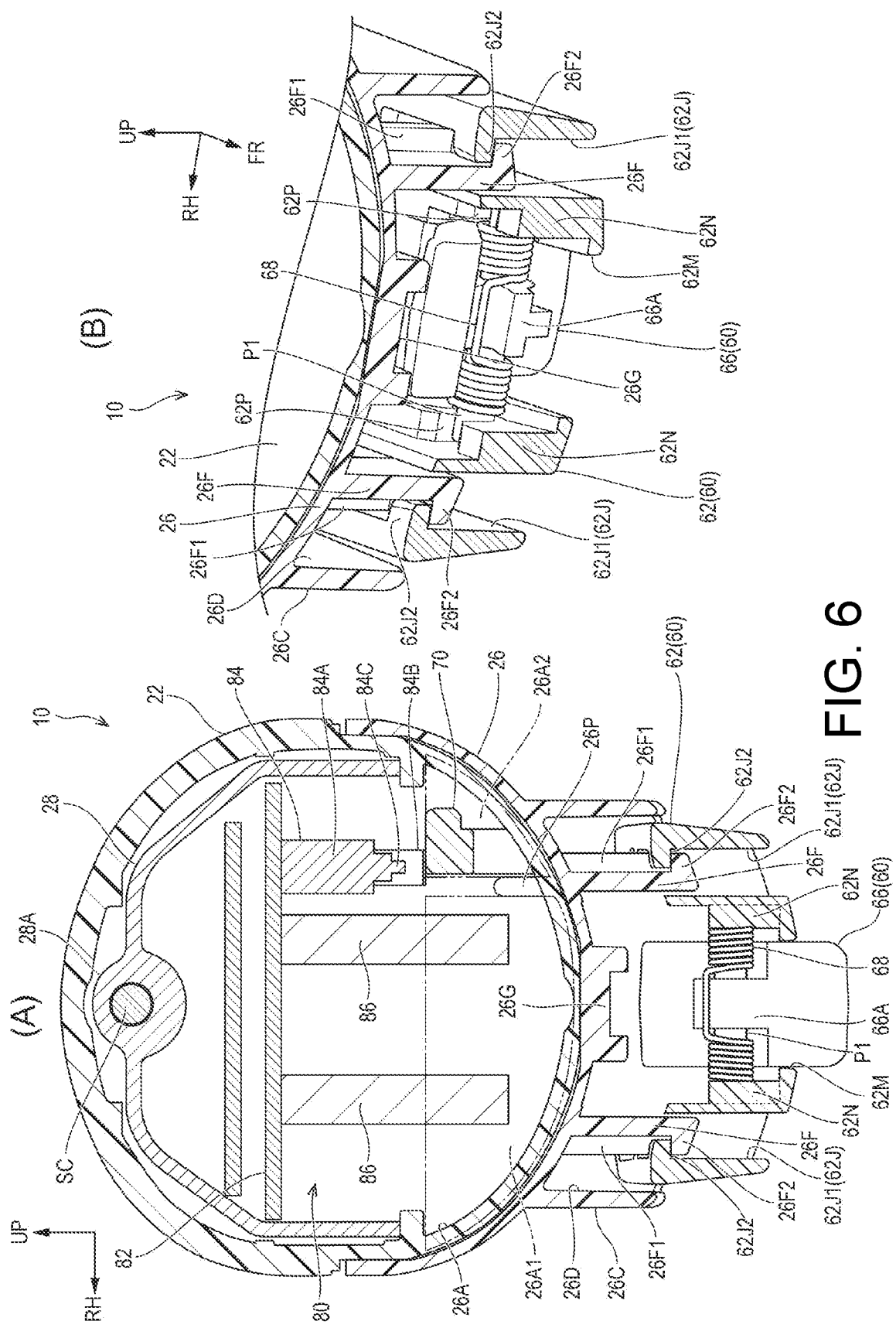
In FIG. 6, (A) is a cross-sectional view (cross-sectional view taken along the line 6A-6A in FIG. 2) as viewed from the front side showing a state in which the stopper part of the rear housing shown in FIG. 2 is inserted into the stopper insertion part of the paddle lever; and (B) is a perspective view as viewed diagonally from the upper left side showing a state in which the stopper part shown in (A) is inserted into the stopper insertion part.

<Regarding the Board Holder 28> As shown in FIG. 3, FIG. 5, and (A) of FIG. 6, the board holder 28 is formed in a substantially elongated box shape that opens to the lower side and extends in the front-rear direction. A pair of upper and lower fixed parts 28A are formed on the front wall of the board holder 28 at positions corresponding to the holder fixing parts 22D of the motor housing 22, and the fixed part 28A is formed in a substantially cylindrical shape with the front-rear direction as the axial direction. A fixing screw SC1 is inserted into the fixed part 28A from the rear side and screwed into the female screw of the holder fixing part 22D, thereby fixing the board holder 28 to the motor housing 22.

A fixing boss 28B (see FIG. 5) is formed at the rear end of the board holder 28 for fixing the rear housing 26, which will be described later, to the motor housing 22. The fixing boss 28B is formed in a substantially cylindrical shape with the front-rear direction as the axial direction, and a female screw is formed on the inner peripheral part of the fixing boss 28B. A fixing screw SC2 may be screwed into the fixing boss 28B. As will be described later, the rear housing 26 may be fixed to the motor housing 22 by fixing the rear housing 26 to the board holder 28 fixed to the motor housing 22 using the fixing screw SC2.

<Regarding the Rear Housing 26> As shown in FIGS. 1 to 7, the rear housing 26 is made of resin and formed in a substantially bottomed cylindrical shape that opens to the front side. The inside of the rear housing 26 is configured as a board accommodating part 26A. A fixing hole (not shown) is formed penetrating through the rear wall of the rear housing 26 at a position corresponding to the fixing boss 28B of the board holder 28. The fixing screw SC2 is inserted into the fixing hole from the rear side and screwed into the fixing boss 28B to fix the rear housing 26 to the board holder 28. Further, when the rear housing 26 is fixed, the front end of the rear housing 26 is fitted over the stepped part 22E of the rear end of the motor housing 22. That is, the board holder 28 functions as a member for fixing the rear housing 26 and connecting the rear housing 26 to the motor housing 22. In addition, the front end surface of the rear housing 26 is inclined forward toward the lower side in a side view.

The rear end of the rear housing 26 is formed with a protruding part 26B protruding to the lower side. The protruding part 26B is formed in a substantially trapezoidal block shape in a side view. In addition, a surrounding wall 26C protruding to the lower side is formed on the outer peripheral part of the lower side of the rear housing 26 in front of the protruding part 26B, and the surrounding wall 26C is formed in a substantially U shape that opens to the front side when viewed from the lower side. A space surrounded by the surrounding wall 26C is configured as a lever accommodating part 26D for accommodating a paddle lever 62, which will be described later, and the lever accommodating part 26D opens to the lower side and front side. In addition, bent parts 26E are formed at intermediate parts in the front-rear direction of the left and right side walls of the surrounding wall 26C. The bent part 26E is bent in a substantially crank shape when viewed from the lower side, and the width dimension (left-right-direction dimension) of the front part of the lever accommodating part 26D is set to be larger than the width dimension of the rear part of the lever accommodating part 26D. In a side view, since the paddle lever 62, which will be described later, is positioned above a straight line connecting the lower end of the protruding part 26B and the rear end of a grindstone 53, the paddle lever 62 may be suppressed from contacting the ground or the like.

Figure 4:
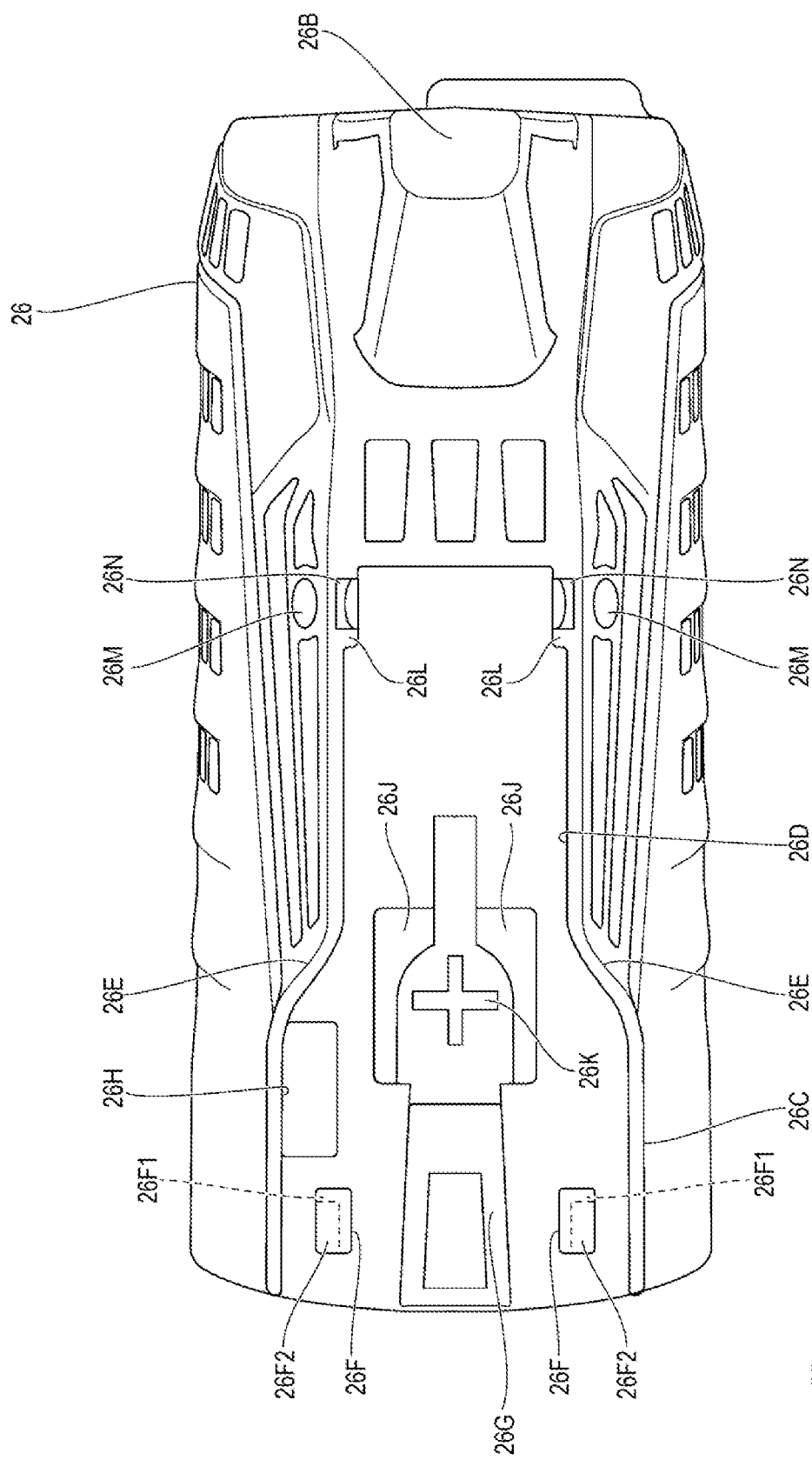
FIG. 4 is a bottom view of the rear housing shown in FIG. 2 as viewed from the lower side.

As shown in FIGS. 2, 4, and 6, a pair of left and right stopper parts 26F are formed on the lower outer peripheral part of the rear housing 26 at the front end of the lever accommodating part 26D. The pair of stopper parts 26F are disposed at symmetrical positions with respect to the central part of the rear housing 26 in the left-right direction. The stopper part 26F is formed in a substantially long plate shape extending in the up-down direction with the left-right direction as the thickness direction, and extends to the lower side from the rear housing 26.

A reinforcing rib 26F1 is formed at the rear end of the stopper part 26F, and the reinforcing rib 26F1 protrudes outward in the left-right direction from the stopper part 26F and extends in the up-down direction. That is, in the right stopper part 26F, the reinforcing rib 26F1 protrudes to the right side from the stopper part 26F, and in the left stopper part 26F, the reinforcing rib 26F1 protrudes to the left side from the stopper part 26F. Further, an engaging part 26F2 is formed at the tip (lower end) of the stopper part 26F. The engaging part 26F2 protrudes outward in the left-right direction from the stopper part 26F, and the rear end of the engaging part 26F2 is connected to the reinforcing rib 26F1.

As shown in FIG. 4, on the lower outer peripheral part of the rear housing 26, between the pair of stopper parts 26F, a contact part 26G is formed to be able to come into contact with an off-lock member 66, which will be described later. The contact part 26G is formed in a substantially U shape that opens to the front side when viewed from the lower side, and protrudes to the lower side from the rear housing 26.

An insertion hole 26H is formed penetrating through the outer peripheral part of the rear housing 26 behind the left stopper part 26F. That is, the insertion hole 26H is disposed on the left side with respect to the central part of the rear housing 26 in the left-right direction. The insertion hole 26H is formed in a substantially rectangular shape whose longitudinal direction is the front-rear direction when viewed from the lower side, and is disposed adjacent to the inner side in the left-right direction of the side wall of the surrounding wall 26C. Further, on the outer peripheral part of the rear housing 26, a pair of left and right spring mounting parts 26J for mounting a lever biasing spring 64 (see FIG. 3), which will be described later, are formed behind the contact part 26G. The spring mounting part 26J is formed in a substantially L shape that opens to the front side and the inner side in the left-right direction when viewed from the lower side, and protrudes to the lower side from the rear housing 26. Further, a spring locking part 26K is formed between the pair of spring mounting parts 26J on the outer peripheral part of the rear housing 26, and the spring locking part 26K is formed in a substantially cross (plus sign) shape when viewed from the lower side and protrudes downward to the lower side from the rear housing 26.

Figure 7:
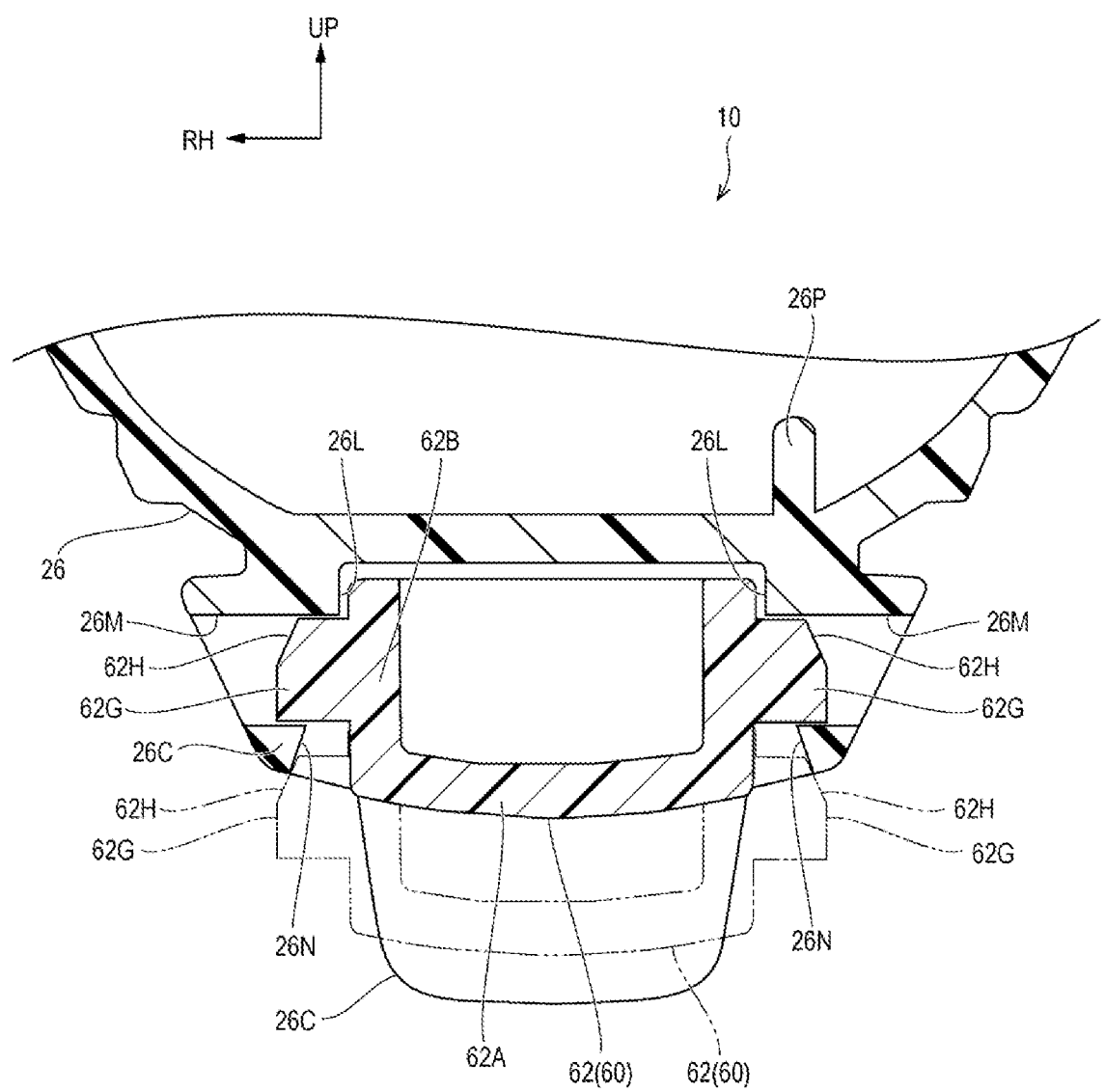
FIG. 7 is a cross-sectional view (cross-sectional view taken along the line 7-7 in FIG. 2) as viewed from the front side showing a state in which the rotating shaft of the paddle lever shown in FIG. 2 is inserted into the support hole of the rear housing.

As shown in FIGS. 2, 4, and 7, a pair of left and right support parts 26L that rotatably support the paddle lever 62, which will be described later, are formed at the rear end of the side wall of the surrounding wall 26C. The pair of left and right support parts 26L are configured to be undivided. The support part 26L protrudes to the inner side in the left-right direction from the inner peripheral surface of the surrounding wall 26C. A circular support hole 26M is formed penetrating through the support part 26L in the left-right direction. Further, a housing-side inclined surface 26N as an inclined part is formed on the left-right direction inner surface of the support part 26L below the support hole 26M. The housing-side inclined surface 26N is inclined to the outer side in the left-right direction toward the lower side when viewed from the front-rear direction.

As shown in FIG. 5, (A) of FIG. 6, and FIG. 7, a restricting rib 26P is formed as a restricting part on the inner peripheral surface of the lower side of the rear housing 26. The restricting rib 26P extends in the front-rear direction with the left-right direction as the thickness direction. Specifically, the restricting rib 26P is disposed adjacent to the right side of the insertion hole 26H and protrudes to the upper side from the inner peripheral surface of the rear housing 26. Further, the front end of the restricting rib 26P is positioned on the right side of the front-rear-direction intermediate part of the insertion hole 26H, and the rear end of the restricting rib 26P is connected to the rear wall of the rear housing 26. In this way, the lower end of the board accommodating part 26A is partitioned in the left-right direction by the restricting rib 26P.

Specifically, the area on the right side of the restricting rib 26P at the lower end of the board accommodating part 26A is configured as a wiring accommodating area 26A1 (see (A) of FIG. 6), and the area on the left side of the restricting rib 26P at the lower end of the board accommodating part 26A is configured as a lever operating area 26A2 (see (A) of FIG. 6).

As shown in FIG. 1, left and right side parts of the rear housing 26 are formed with multiple intake ports 26R. The multiple intake ports 26R disposed substantially in the up-down direction form one set, and five sets of intake ports 26R are disposed side by side in the front-rear direction.

(Motor 30) As shown in FIGS. 3 and 5, the motor 30 is configured as a three-phase brushless motor and housed in the motor accommodating part 22A of the motor housing 22. The motor 30 includes a rotor 32 and a stator 33, and a rotating shaft 31 is attached to the rotor 32.

The rotating shaft 31 is disposed with the front-rear direction as its axial direction. A front end of the rotating shaft 31 is rotatably supported by a first motor bearing 35 fixed to the gear housing 24, and a rear end of the rotating shaft 31 is rotatably supported by a second motor bearing 36 fixed to the bearing accommodating part 22C of the motor housing 22. The rotor 32 is disposed radially outside the rotating shaft 31 and is configured to be rotatable integrally with the rotating shaft 31.

The stator 33 is formed in a substantially cylindrical shape with the front-rear direction as the axial direction, and is supported by the motor housing 22 on the radially outer side of the rotor 32. The stator 33 has a stator holder, and stator coils corresponding to the U phase, V phase, and W phase of the motor 30 are wound around the stator holder. One ends of motor-side lead wires 38A, 38B, and 38C as electrical components and wiring are connected to the ends of the stator coils corresponding to the U phase, the V phase, and the W phase, respectively (see the lead wires colored in gray in FIG. 5). The motor-side lead wires 38A, 38B, and 38C are disposed below the bearing accommodating part 22C of the motor housing 22 and inside the wiring accommodating area 26A1 of the rear housing 26. That is, the motor-side lead wires 38A, 38B, and 38C extend in the front-rear direction within the wiring accommodating area 26A1 of the rear housing 26. Further, the other ends of the motor-side lead wires 38A, 38B, and 38C are connected by a connector 39 to board-side lead wires 40A, 40B, and 40C (see the lead wires colored in black in FIG. 5) as electrical components and wiring, and the board-side lead wires 40A, 40B, and 40C are connected to the control board 82 of the control part 80, which will be described later. In this way, the motor 30 is configured to be driven by the control part 80. Further, the board-side lead wires 40A, 40B, and 40C are disposed in the wiring accommodating area 26A1, like the motor-side lead wires 38A, 38B, and 38C.

As shown in FIG. 3, the fan 42 is provided on the front-side part of the rotating shaft 31 behind the first motor bearing 35 to be rotatable integrally. The fan 42 is configured as an axial fan. Specifically, the fan 42 is configured to generate an airflow directed from the rear side to the front side. In this way, air is allowed to flow into the housing 20 from the intake port 26R of the rear housing 26, and the air is discharged from an exhaust port (not shown) formed in the overhanging part 24B of the gear housing 24. Therefore, the airflow generated by the fan 42 cools the control part 80 and the motor 30, which will be described later.

Further, a front end of the rotating shaft 31 is accommodated in the overhanging part 24B of the gear housing 24, and a pinion gear 44 is fixed to the front end of the rotating shaft 31. The gear teeth of the pinion gear 44 are inclined to the inner side in the radial direction of the rotating shaft toward the front side.

(Regarding the Transmission Mechanism 50) The transmission mechanism 50 has an output shaft 51 with the up-down direction as the axial direction, and the output shaft 51 is accommodated in the overhanging part 24B of the gear housing 24. An up-down-direction intermediate part of the output shaft 51 is rotatably supported by a bearing 52 fixed to the gear housing 24.

A lower end of the output shaft 51 is configured as a tool mounting part 51A, and a male screw is formed on an outer peripheral part of the tool mounting part 51A. A disk-shaped grindstone 53 as a tool is attached to the tool mounting part 51A. Specifically, the grindstone 53 is attached to the tool mounting part 51A by fitting a mounting hole 53A of the grindstone 53 over the tool mounting part 51A and screwing a nut N into the tool mounting part 51A. An outer peripheral part of the grindstone 53 is partially covered with a wheel guard 55. The wheel guard 55 is configured so that a large part of the grindstone 53 may be changed as desired, and is positioned to cover the rear part of the grindstone 53 in the state shown in FIGS. 1 and 3. Between the front end of the paddle lever 62, which will be described later, and the wheel guard 55, a space is provided that allows one finger to enter but not two fingers to enter.

A bevel gear 54 is fixed to the upper end of the output shaft 51, and the bevel gear 54 meshes with the pinion gear 44. Accordingly, when the motor 30 is driven, the rotation of the motor 30 is transmitted to the output shaft 51, and the grindstone 53 rotates around the output shaft 51.

(Regarding the Operating Mechanism 60) As shown in FIGS. 1 to 3 and 6, the operating mechanism 60 includes the paddle lever 62 as a lever, the off-lock member 66, and an interlocking lever 70.

Figure 8:
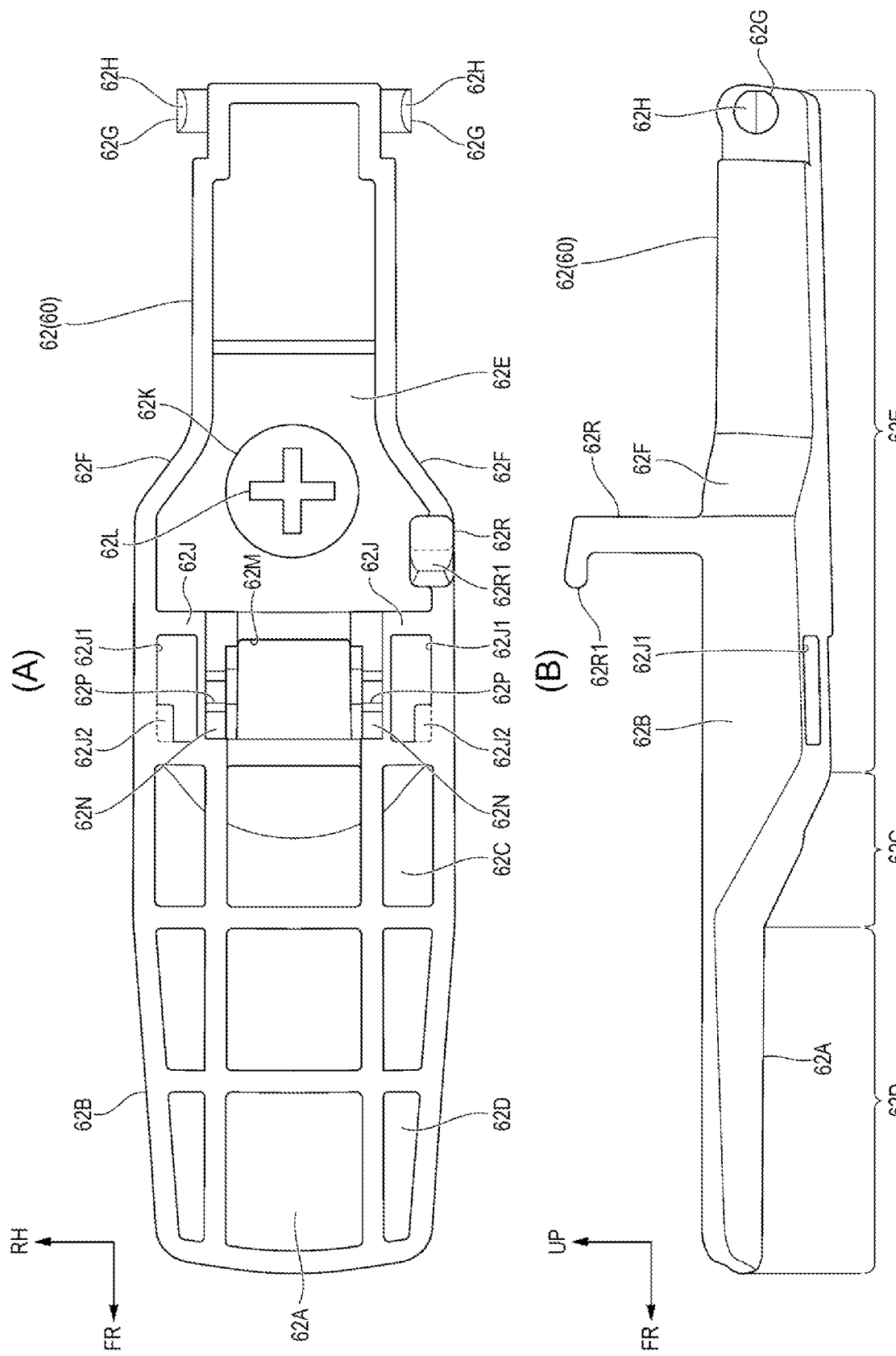
In FIG. 8, (A) is a plan view of the paddle lever shown in FIG. 2 as viewed from the upper side, and (B) is a side view of the paddle lever of (A) as viewed from the left side.
Figure 9:
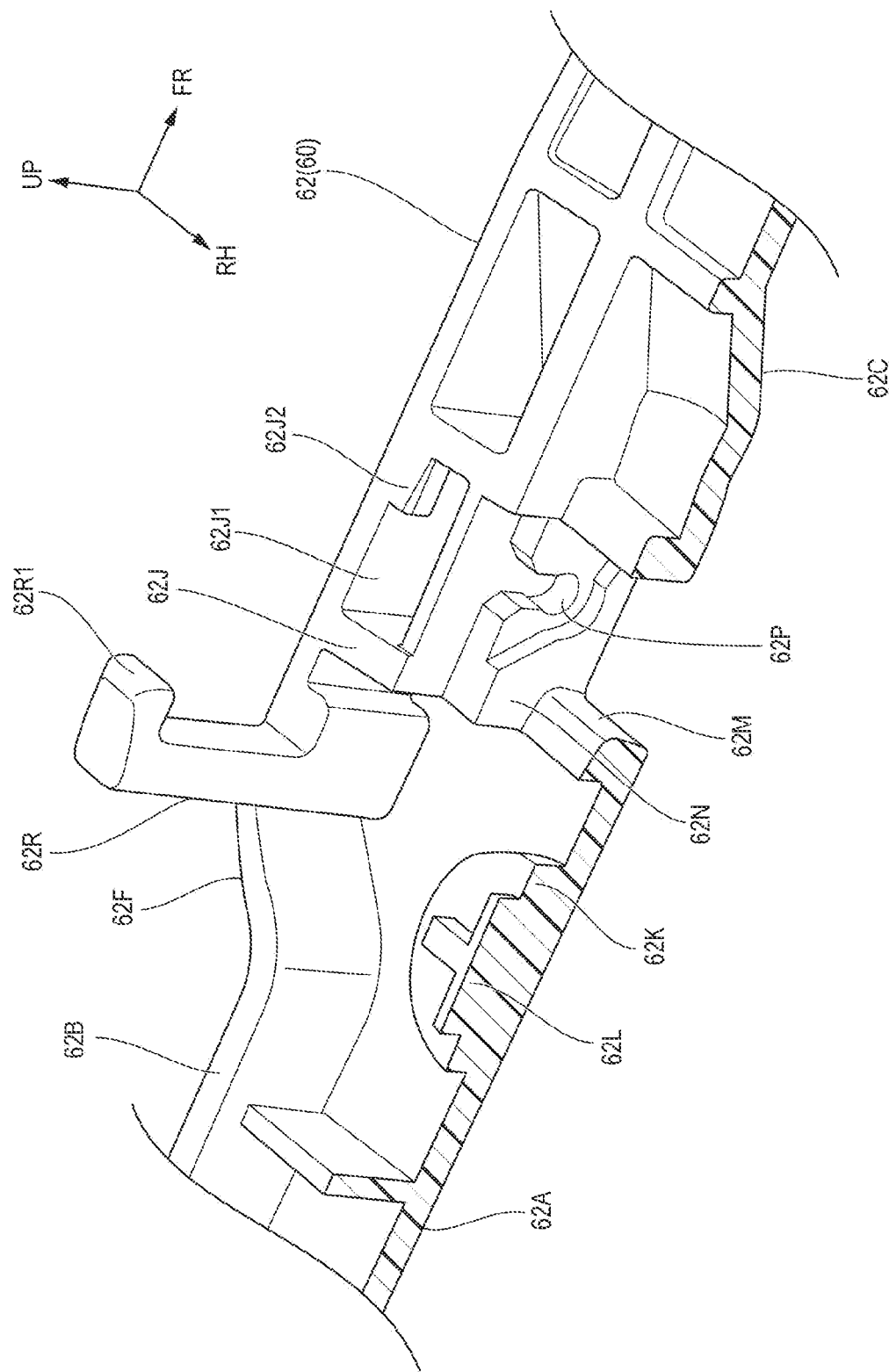
FIG. 9 is a cross-sectional view of an intermediate part in the longitudinal direction of the paddle lever shown in FIG. 8 as viewed diagonally from the upper right side.

<Regarding the Paddle Lever 62> As shown in FIGS. 8 and 9, the paddle lever 62 is made of resin, and is formed in a substantially rectangular concave shape that opens to the upper side and extends in the front-rear direction. Specifically, the paddle lever 62 includes a bottom wall 62A and a peripheral wall 62B protruding to the upper side from the outer peripheral part of the bottom wall 62A. A lever stepped part 62C is formed in the front-rear-direction intermediate part of the bottom wall 62A, and the lever stepped part 62C is bent substantially like a crank in a side view and is inclined to the upper side toward the front side. A part of the paddle lever 62 in front of the lever stepped part 62C is configured as a lever gripping part 62D, and a part of the paddle lever 62 behind the lever stepped part 62C is configured as a lever body part 62E (lever central part). The lever gripping part 62D is configured as a part to be gripped by the user, and the thickness of the lever gripping part 62D is set thinner than the thickness of the lever body part 62E.

Further, a pair of left and right bent parts 62F are formed behind the lever stepped part 62C in a front-rear-direction intermediate part of the peripheral wall 62B. The bent part 62F is bent in a substantially crank shape when viewed from the lower side, and the width dimension (left-right-direction dimension) of the rear end of the lever body part 62E is set to be smaller than the width dimension of the other parts.

As also shown in FIG. 7, a pair of left and right rotating shafts 62G are formed at the rear end of the side wall of the peripheral wall 62B. The rotating shaft 62G is formed in a substantially columnar shape with the left-right direction as the axial direction, and protrudes to the outer side in the left-right direction (outward in the width direction of the paddle lever 62) from the peripheral wall 62B. The rear end of the paddle lever 62 is accommodated in the lever accommodating part 26D of the rear housing 26, and the rotating shaft 62G is inserted into the support hole 26M of the rear housing 26 from the inside in the left-right direction and is rotatably supported by the support hole 26M. In this way, the paddle lever 62 is rotatably connected to the rear housing 26. Specifically, the paddle lever 62 is configured to rotate between an initial position (indicated by a solid line in FIG. 1) and an operating position (indicated by a two-dot chain line in FIG. 1) rotated clockwise from the initial position as viewed from the left side. At the initial position, the paddle lever 62 is inclined to the lower side toward the front side, and at the operating position, the paddle lever 62 is set substantially horizontal. When the paddle lever 62 is connected to the rear housing 26, the lever gripping part 62D of the paddle lever 62 extends to the front side from the lever accommodating part 26D and is disposed below the motor housing 22. This allows the operator to operate the paddle lever 62 while gripping the motor housing 22 that does not have the intake port 26R.

A shaft-side inclined surface 62H as an inclined part is formed on the upper part of the tip surface of the rotating shaft 62G. The shaft-side inclined surface 62H is inclined to the inner side in the left-right direction toward the upper side when viewed from the front-rear direction. Accordingly, it is configured that when the paddle lever 62 is assembled to the rear housing 26, the rotating shaft 62G is disposed below the housing-side inclined surface 26N of the rear housing 26 (see the paddle lever 62 indicated by the two-dot chain line in FIG. 7), and by pushing the rotating shaft 62G to the upper side, the shaft-side inclined surface 62H slides on the housing-side inclined surface 26N, and the peripheral wall 62B of the paddle lever 62 and the surrounding wall 26C of the rear housing 26 are bent and deformed, and the rotating shaft 62G is fitted into the support hole 26M. That is, the rotating shaft 62G is rotatably fitted in the support hole 26M by so-called snap-fitting. In this way, the housing-side inclined surface 26N and the shaft-side inclined surface 62H are configured as functional parts that facilitate snap-fitting between the rotating shaft 62G and the support hole 26M.

A pair of left and right stopper insertion parts 62J are formed on the bottom wall 62A of the paddle lever 62 behind the lever stepped part 62C. The stopper insertion part 62J is disposed at a position corresponding to the stopper part 26F of the rear housing 26 described above. The stopper insertion part 62J is formed in a substantially rectangular tubular shape with the up-down direction as the axial direction, and the left-right-direction outer wall part of the stopper insertion part 62J is configured by the peripheral wall 62B. The inside of the stopper insertion part 62J is configured as an insertion hole 62J1 as a hole, and the insertion hole 62J1 penetrates in the up-down direction. The upper opening of the stopper insertion part 62J is provided with an engaged part 62J2 at the front and left-right-direction outer corner part. The engaged part 62J2 is formed in a substantially rectangular plate shape with the up-down direction as the thickness direction and the front-rear direction as the longitudinal direction. In this way, the upper opening of the stopper insertion part 62J is formed in a substantially L shape. In other words, the upper opening of the stopper insertion part 62J is partially closed by the engaged part 62J2 on the front side so that it is narrow in the left-right direction and wide on the rear side.

As shown in (A) and (B) of FIG. 6, the stopper part 26F of the rear housing 26 is inserted into the insertion hole 62J1 of the stopper insertion part 62J through the upper opening of the stopper insertion part 62J. In addition, when the stopper part 26F is inserted into the stopper insertion part 62J, the stopper part 26F is disposed inside the engaged part 62J2 in the left-right direction, and the engaging part 26F2 of the stopper part 26F is disposed adjacent to the lower side of the engaged part 62J2. In this way, the engaging part 26F2 and the engaged part 62J2 engage (contact) in the up-down direction, and the downward rotation of the paddle lever 62 in the initial position is limited. That is, the initial position of the paddle lever 62 is the state where the engaging part 26F2 and the engaged part 62J2 are engaged. Further, the stopper part 26F is sandwiched in the left-right direction by the inner peripheral surface of the stopper insertion part 62J (more specifically, the inner peripheral surface on the inner side in the left-right direction) and the engaged part 62J2. Therefore, the displacement of the stopper part 26F in the left-right direction is limited by the stopper insertion part 62J and the engaged part 62J2. That is, the pair of left and right stopper parts 26F is configured to suppress the swing, deformation, and bending of the paddle lever 62 in the left-right direction.

As shown in FIGS. 3, 8, and 9, a spring seat 62K is formed at the rear part of the bottom wall 62A of the paddle lever 62. The spring seat 62K is disposed at the rear side of the stopper insertion part 62J and at the central part of the paddle lever 62 in the left-right direction. The spring seat 62K is formed in a substantially columnar shape with the up-down direction as the axial direction, and protrudes to the upper side from the bottom wall 62A. The lever biasing spring 64 (see FIG. 3) as a spring is mounted on the spring seat 62K. The lever biasing spring 64 is configured as a compression coil spring, and the lower end of the lever biasing spring 64 is locked to the spring seat 62K. In addition, the upper end of the lever biasing spring 64 is disposed between the pair of spring mounting parts 26J of the rear housing 26 and locked to the rear housing 26. In this way, the paddle lever 62 is biased to the lower side by the biasing force of the lever biasing spring 64 and held at the initial position. A spring locking part 62L is formed on the upper surface of the spring seat 62K, and the spring locking part 62L is formed in a substantially cross (plus sign) shape when viewed from the upper side. The spring locking part 26K of the rear housing 26 and the spring locking part 62L of the paddle lever 62 are disposed inside the lever biasing spring 64 to limit the movement of the lever biasing spring.

Figure 10:
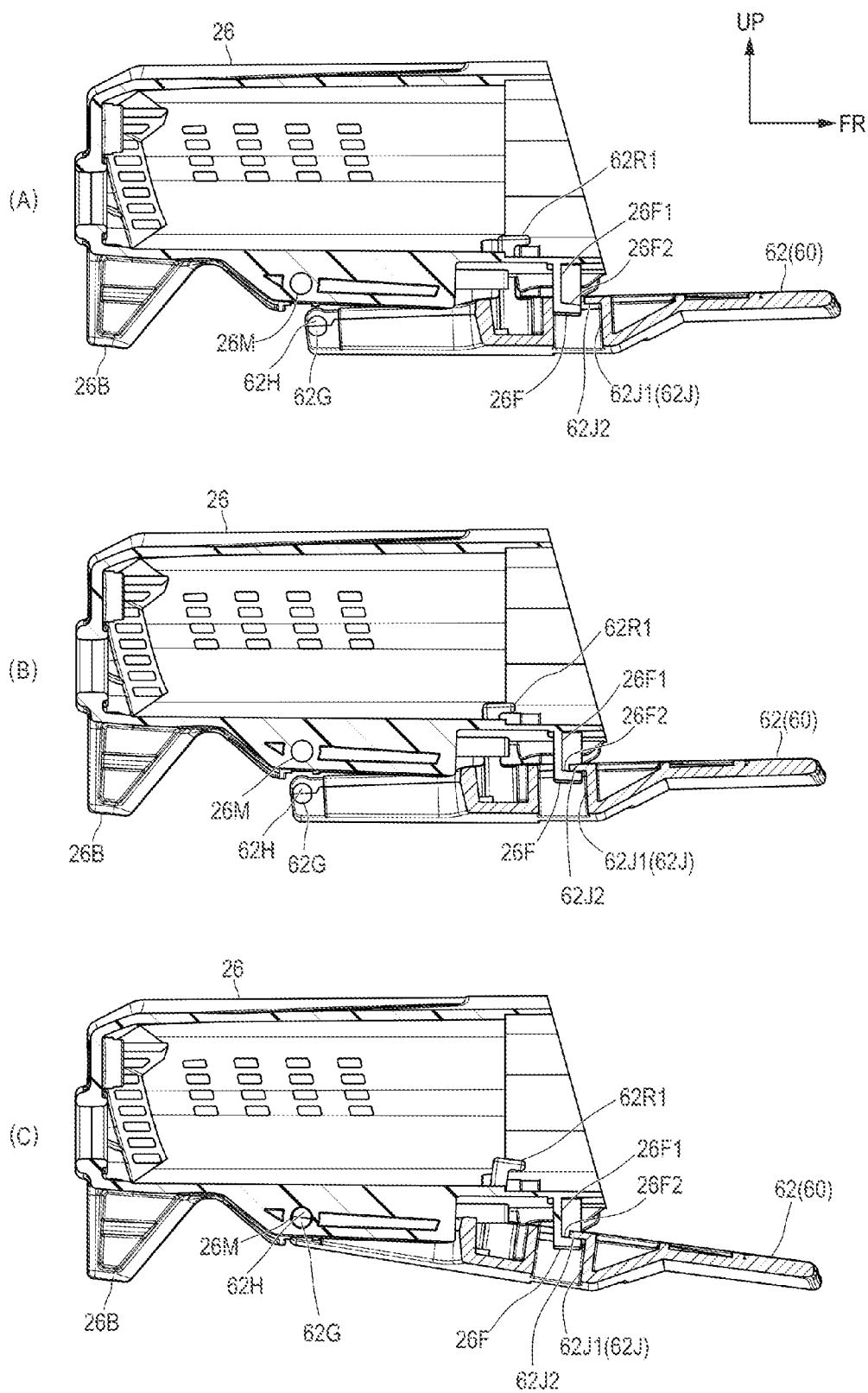
FIG. 10 is a view showing the process of mounting the paddle lever.

Here, the operation of mounting the paddle lever 62 to the rear housing 26 will be described with reference to FIGS. 6 and 10. FIG. 10 is a view showing the process of mounting the paddle lever 62 to the rear housing 26. In order to mount the paddle lever 62 to the rear housing 26, first, to position the stopper part 26F inside the stopper insertion part 62J, the engaging part 26F2 is inserted from the upper opening of the stopper insertion part 62J as shown in (A) of FIG. 10. At this time, the upper opening of the stopper insertion part 62J is partially closed by the engaged part 62J2, and the engaging part 26F2 may not pass through this closed area; therefore, the engaging part 26F2 is inserted through the gap on the rear side of the upper opening of the stopper insertion part 62J that is not partially closed by the engaged part 62J2. Therefore, when the engaging part 26F2 is inserted from the upper opening of the stopper insertion part 62J, the paddle lever 62 is moved slightly to the front side relative to the rear housing 26 from the assembled position in FIG. 2. Therefore, when the engaging part 26F2 is inserted from the upper opening of the stopper insertion part 62J, the rotating shaft 62G and the support hole 26M are separated from each other in the front-rear direction, and they are not in an engageable positional relationship.

Next, as shown in (B) of FIG. 10, by moving the paddle lever 62 to the rear side relative to the rear housing 26, the engaging part 26F2 is positioned below the engaged part 62J2. At this time, as also shown in (B) of FIG. 6, the reinforcing rib 26F1 is positioned behind the engaged part 62J2 to suppress the paddle lever 62 from moving to the rear side more than necessary. That is, the reinforcing rib 26F1 functions as an auxiliary member when assembling the paddle lever 62 to the rear housing 26 in addition to improving the durability of the stopper part 26F itself.

Finally, the rearward movement of the paddle lever 62 brings the rotating shaft 62G and the support hole 26M to the same position in the front-rear direction, and places them in an engageable positional relationship. By pressing the rotating shaft 62G to the upper side (rear housing 26) from this state, the rotating shaft 62G is engaged with the support hole 26M by the aforementioned snap-fitting (the state shown in (C) of FIG. 10). Immediately before snap-fit fitting (the position of the paddle lever 62 indicated by the two-dot chain line in FIG. 7), the movement of the paddle lever 62 in the direction away from the rear housing 26 (downward) is restricted by the engagement between the engaged part 62J2 and the engaging part 26F2; in addition, in a state where the shaft-side inclined surface 62H and the housing-side inclined surface 26N are in contact with each other, movement of the rotating shaft 62G in the front-rear direction is restricted by abutting the front and rear sides of the cylindrical rotating shaft 62G with the support part 26L. Therefore, the paddle lever 62 is restricted from moving to the lower side and in the front-rear direction relative to the rear housing 26. In this way, assembly by pressing the paddle lever 62 to the upper side and snap-fitting is facilitated, and the assembly property may be improved. That is, since there is an engaging part (the engaged part 62J2 and the engaging part 26F2) that restricts relative movement (separation) between the paddle lever 62 and the rear housing 26 when the paddle lever 62 is snap-fitted to the rear housing 26, assembly becomes easy.

Back to the description of the structure of the paddle lever 62, a disposition hole 62M is formed penetrating the bottom wall 62A of the paddle lever 62 for disposing the off-lock member 66, which will be described later, between the pair of stopper insertion parts 62J, and the disposition hole 62M is formed in a substantially rectangular shape in a plan view. Further, the bottom wall 62A of the paddle lever 62 is formed with a pair of left and right bearing parts 62N. The bearing part 62N is disposed between the disposition hole 62M and the stopper insertion part 62J, and protrudes to the upper side from the bottom wall 62A. A bearing groove 62P is formed in the bearing part 62N, and the bearing groove 62P opens to the upper side and to the inner side in the left-right direction. In addition, a support pin P1 (see (A) and (B) in FIG. 6) with the left-right direction as the axial direction is bridged over the pair of bearing parts 62N, and both ends of the support pin P1 in the longitudinal direction are fitted into the lower end of the bearing groove 62P.

The peripheral wall 62B on the left side of the paddle lever 62 is provided with a switch operating part 62R for operating a switch 84, which will be described later. The switch operating part 62R is formed in a substantially rectangular columnar shape with the up-down direction as the axial direction, and extends to the upper side from the peripheral wall 62B. Further, the upper part of the switch operating part 62R is inserted through the insertion hole 26H of the rear housing 26 from below and is disposed within the lever operating area 26A2 of the rear housing 26. That is, the switch operating part 62R is disposed adjacent to the left side of the restricting rib 26P. An operating protrusion 62R1 is formed at the upper end of the switch operating part 62R, and the operating protrusion 62R1 protrudes to the front side from the switch operating part 62R.

<Regarding the off-lock member 66> As shown in FIGS. 2, 3, and 6, the off-lock member 66 is formed in a substantially rectangular plate shape with the front-rear direction as the thickness direction, and is bent in a substantially crank shape when viewed from the left-right direction. Specifically, the upper end of the off-lock member 66 is located on the front side of the lower end of the off-lock member 66. A lock support part 66A protruding to the front side is formed in the up-down-direction intermediate part of the off-lock member 66. The off-lock member 66 is disposed in the disposition hole 62M of the paddle lever 62, and the lock support part 66A is rotatably supported by the support pin P1. That is, the off-lock member 66 is rotatably connected to the paddle lever 62, and the off-lock member 66 and the pair of stopper insertion parts 62J are disposed side by side in the left-right direction.

A lock spring 68 configured as a torsion spring is attached to the support pin P1, and the lock spring 68 biases the off-lock member 66 counterclockwise when viewed from the left side. When the off-lock member 66 is connected to the paddle lever 62, the lower end of the off-lock member 66 protrudes below the paddle lever 62. In this way, the lower part of the off-lock member 66 is brought into contact with the rear surface of the disposition hole 62M by the biasing force of the lock spring 68, and the off-lock member 66 is held in the locked position (the position indicated by the solid line in FIG. 3). Further, at the locked position of the off-lock member 66, the upper end of the off-lock member 66 is disposed close to the lower side of the contact part 26G of the rear housing 26. Therefore, when the paddle lever 62 is to rotate from the initial position toward the operating position, the upper end of the off-lock member 66 abuts against the contact part 26G; therefore, the paddle lever 62 is prevented from rotating from the initial position to the operating position side.

In addition, when the off-lock member 66 is rotated clockwise from the locked position, the upper end of the off-lock member 66 is displaced to the lower side with respect to the contact part 26G (at the position indicated by the two-dot chain line in FIG. 3; this position is hereinafter referred to as the unlocked position). In this way, by rotating the off-lock member 66 to the unlocked position, the paddle lever 62 is allowed to rotate from the initial position to the operating position side.

Figure 11:
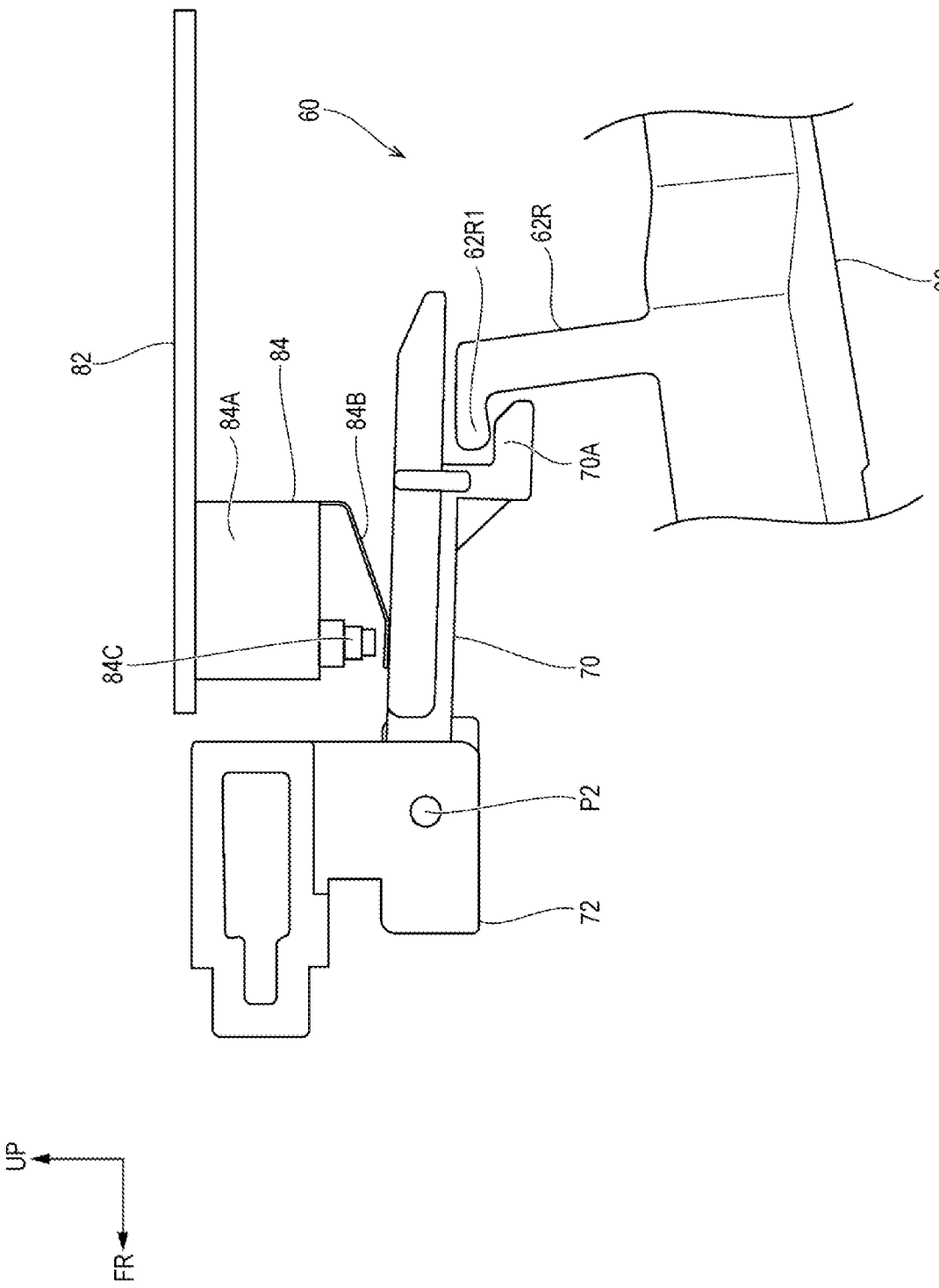
FIG. 11 is a side view of the operating mechanism of the disc grinder shown in FIG. 1 as viewed from the left side.

<Regarding the Interlocking Lever 70> As shown in FIG. 11, the interlocking lever 70 is formed in a substantially elongated shape extending in the front-rear direction, and is disposed in the lever operating area 26A2 of the rear housing 26 (not shown in FIG. 11). Specifically, the rear end of the interlocking lever 70 is disposed adjacent to the upper side of the switch operating part 62R of the paddle lever 62, and the interlocking lever 70 is disposed to straddle the rear end of the motor housing 22 (not shown in FIG. 11) and the front end of the rear housing 26. The front end of the interlocking lever 70 is connected to a lever holder 72 provided inside the motor housing 22. Specifically, the lever holder 72 is provided with a support pin P2 with the left-right direction as the axial direction, and the front end of the interlocking lever 70 is rotatably supported by the support pin P2.

A lever connecting part 70A is formed at the rear end of the interlocking lever 70. The lever connecting part 70A protrudes to the lower side from the interlocking lever 70 and bends to the rear side. The operating protrusion 62R1 of the paddle lever 62 is inserted between the rear end of the interlocking lever 70 and the lever connecting part 70A. In this way, the interlocking lever 70 and the paddle lever 62 are engaged (contacted) in both up-down directions; therefore, when the paddle lever 62 rotates between the initial position and the operating position, the interlocking lever 70 rotates around the axis of the support pin P2 in conjunction with the rotation of the paddle lever 62. Specifically, at the initial position of the paddle lever 62, the interlocking lever 70 is disposed at a non-pressing position (the position shown in FIG. 11), and at the operating position of the paddle lever 62, the interlocking lever 70 is disposed at a pressing position (not shown) rotated to the upper side from the non-pressing position. Because of the engagement relationship described above, when the paddle lever 62 is in the initial position, the interlocking lever 70 is also at the downward rotating position (non-pressing position in FIG. 11); therefore, it is possible to prevent the switch part 84C, which will be described later, from being kept pressed.

(Regarding the Control Part 80) As shown in FIGS. 3 and 5, the control part 80 includes the control board 82, and the control board 82 is formed in a substantially rectangular plate shape with the up-down direction as the thickness direction and the front-rear direction as the longitudinal direction. The control board 82 is disposed inside the board holder 28 and held by the board holder 28. Specifically, the control board 82 is accommodated in the upper part of the board accommodating part 26A of the rear housing 26. In this way, the aforementioned restricting rib 26P of the rear housing 26 is disposed below the control board 82 (on one side in the thickness direction).

A switch 84 as an electrical component for turning on and off the motor 30 is provided on the lower surface (one side surface) of the control board 82, and the switch 84 is disposed above the front part of the interlocking lever 70 described above (see FIG. 11). Specifically, in the up-down direction, the restricting rib 26P of the rear housing 26 and a part (right end) of the switch 84 are disposed to face each other, and the left part of the switch 84 and the interlocking lever 70 are disposed to face each other (see (A) of FIG. 6).

The switch 84 is configured as a lever type switch. Specifically, the switch 84 includes a switch body 84A mounted on the control board 82, a lever part 84B rotatably connected to the switch body 84A, and a switch part 84C pressed by the lever part 84B. The lever part 84B is in contact with the upper surface of the interlocking lever 70 (see FIG. 11). In this way, when the interlocking lever 70 rotates from the non-pressing position to the pressing position in conjunction with the rotation of the paddle lever 62, the lever part 84B presses the switch part 84C of the switch 84 to switch the switch 84 from off to on.

Further, the board-side lead wires 40A, 40B, and 40C described above are connected to the control board 82, and the control board 82 and the motor 30 are electrically connected. Multiple (six in this embodiment) switching elements 86 as electrical components are provided on the lower surface (one side surface) of the control board 82, and the switching elements 86 are electrically connected to the stator coils of the motor 30 by the motor-side lead wires 38A, 38B, and 38C and the board-side lead wires 40A, 40B, and 40C. Further, the switching elements 86 configure an inverter circuit that switches the energized state of the stator coils in the motor 30.

The switching elements 86 are configured by a set of three switching elements 86, and the switching elements 86 forming a set are disposed side by side in the front-rear direction. Two sets of switching elements 86 are disposed side by side in the left-right direction. Specifically, two sets of switching elements 86 are disposed to the right side of the switch 84 and the restricting rib 26P. Accordingly, the motor-side lead wires 38A, 38B, and 38C and the board-side lead wires 40A, 40B, and 40C disposed in the wiring accommodating area 26A1 are disposed below the switching elements 86.

Further, the switching element 86 disposed on the left side (switch 84 side) is disposed close to the right side of the switch 84 and the restricting rib 26P. Further, the tip (lower end) of the switching element 86 is disposed below the tip (upper end) of the restricting rib 26P. That is, when viewed from the left-right direction, the tip of the switching element 86 and the tip of the restricting rib 26P are disposed to overlap each other. In this way, the switching element 86 and the restricting rib 26P restrict the movement of the motor-side lead wires 38A, 38B, and 38C and the board-side lead wires 40A, 40B, and 40C from the wiring accommodating area 26A1 to the lever operating area 26A2. In this embodiment, the restricting rib 26P is configured to overlap the switching element 86, which has a particular height; however, for example, it may be configured to overlap electrical components such as a smoothing capacitor and a diode bridge for rectification. Further, the gap between the tip of the switching element 86 and the tip of the restricting rib 26P in the left-right direction is configured to be smaller than the thickness of the motor-side lead wires 38A, 38B, and 38C and the board-side lead wires 40A, 40B, and 40C. In this way, these lead wires may be prevented from passing between the switching element 86 and the restricting rib 26P, and the lead wires may be more preferably prevented from moving toward the lever operating area 26A2.

Further, a power cord 88 is connected to the control board 82, and the power cord 88 extends to the rear side from the rear end of the rear housing 26. The power cord 88 is configured to be connectable to an AC power supply. In this way, power is supplied to the motor 30.

(Action and Effects) Next, action and effects of the grinder 10 of this embodiment will be described.

In the non-operating state of the grinder 10 configured as described above, the paddle lever 62 is disposed at the initial position, and the interlocking lever 70 is disposed at the non-pressing position. Further, in this state, the off-lock member 66 is disposed at the locked position. Therefore, the off-lock member 66 prevents the paddle lever 62 from rotating toward the operating position side.

When the grinder 10 is operated, the off-lock member 66 is rotated from the locked position to the unlocked position. This allows the paddle lever 62 to rotate from the initial position to the operating position. In this state, when the paddle lever 62 is rotated from the initial position to the operating position, the interlocking lever 70 is rotated from the non-pressing position to the pressing position in conjunction with the rotation of the paddle lever 62, and the switch 84 is switched from off to on. In this way, the motor 30 is driven under the control of the control part 80. Specifically, the rotating shaft 31 of the motor 30 rotates, and the output shaft 51 of the transmission mechanism 50 rotates. In this way, the grindstone 53 attached to the output shaft 51 rotates. Therefore, cutting and polishing may be applied to the workpiece.

Here, in the grinder 10, the paddle lever 62 is provided with the rotating shaft 62G as a single piece, and the rotating shaft 62G is rotatably connected to the rear housing 26. In addition, the stopper part 26F for restricting the rotation range of the paddle lever 62 is formed with the rear housing 26 as a same piece. Furthermore, the rear housing 26 and the paddle lever 62 are each configured by a single member. In this way, the assembly property of the grinder 10 may be improved.

That is, suppose that the rear housing 26 were divided into two parts in the left-right direction and the front end of the paddle lever 62 were connected to the motor housing 22 (hereinafter, this case is referred to as the grinder of the comparative example), then it would be necessary to connect the front end of the paddle lever 62 to the motor housing 22 and engage the stopper part 26F and the paddle lever 62 while assembling the two-part rear housing 26 together. In other words, in the grinder of the comparative example, it is necessary to assemble the paddle lever 62 to the motor housing 22 and the rear housing 26 that are two members. Further, in the grinder of the comparative example, it is necessary to assemble the two divided parts of the rear housing 26 together. Therefore, the assembly of the grinder of the comparative example is complicated, and there is a possibility that the assembly property is lowered.

In contrast, in the grinder 10 of this embodiment, the rear housing 26 and the paddle lever 62 are configured as a single member, and the paddle lever 62 is rotatably connected to the rear housing 26. Therefore, by connecting the paddle lever 62 to the rear housing 26 and engaging the stopper part 26F of the rear housing 26, the paddle lever 62 and the rear housing 26 may be unitized. In other words, unlike the grinder of the comparative example, it is not necessary to assemble the paddle lever 62 to the motor housing 22 and the rear housing 26 that are two members. In addition, since the rear housing 26 is configured by a single member, it is not necessary to assemble the rear housings 26 divided into two parts, unlike the grinder of the comparative example. As a result, the number of man-hours for assembly may be significantly reduced compared with the grinder of the comparative example. Further, the rear housing 26 and paddle lever 62 in a unit state may be assembled to the motor housing 22. Therefore, the assembly property of the grinder 10 may be improved.

In addition, in this embodiment, since the rear housing 26 is configured by a single member, compared with a configuration in which the rear housing 26 is divided, the capacity of the board accommodating part 26A of the rear housing 26 may be increased, which may contribute to the size reduction of the grinder 10. That is, suppose that the rear housing 26 were divided in the left-right direction, then it would be necessary to provide a fixing part inside or outside the rear housing 26 for fixing the two divided parts of the rear housing 26 to each other. When the fixing part is provided inside the rear housing 26, the capacity of the board accommodating part 26A tends to decrease. Further, when the fixing part is provided outside the rear housing 26, the size of the grinder 10 tends to increase. In contrast, in this embodiment, as described above, at least a part of the housing (rear housing 26) configuring the grinder 10 is configured by an undivided single member, and this part is configured as a support part for supporting the paddle lever 62 being a single member. That is, the housing that configures the grinder 10 has an undivided support part for supporting the paddle lever 62 having the rotating shaft as a single member. Therefore, it is not necessary to provide the fixing part inside or outside the rear housing 26. As a result, compared with a configuration in which the rear housing 26 is divided, the capacity of the board accommodating part 26A of the rear housing 26 may be increased, which may contribute to the size reduction of the grinder 10.

Furthermore, in this embodiment, the switch 84 pressed by the paddle lever 62 is supported by the motor housing 22, and the paddle lever 62 is supported by the rear housing 26. In this way, the rear housing 26 that supports the paddle lever 62 may be assembled to the motor housing 22 that supports the switch 84 (board holder 28). That is, since the rear housing 26 unitized with the paddle lever 62 may be assembled with the motor housing 22 unitized with electrical components such as the switch 84, two units are operated when they are assembled, so it is only necessary to screw the fixing screw SC2 into the fixing boss 28B through the rear housing 26 while maintaining the connecting state; that is, the assembly may be performed with a simple work such as screwing two parts together, so the assembly property is very good. Therefore, the control board 82 and the electrical components mounted thereon are disposed so as not to interfere with the assembly of the rear housing 26. More specifically, when the rear housing 26 is connected so as to move toward the rear part of the motor housing 22 (from the rear to the front) and accommodate the control board 82 and the like, the inner surface of the rear housing 26 and the restricting rib 26P are designed so that they do not interfere due to contact with the control board 82 and the electrical components (switching elements 86 and the like) mounted thereon, so as not to hinder the assembly. In this embodiment, the rear housing 26 is configured as a single member to reduce the number of parts, but the effect of improving the assembly property by the two unitized parts described above may be obtained even if the rear housing 26 is a divided type housing.

Further, in this embodiment, the rear end of the paddle lever 62 is rotatably connected to the rear housing 26, and the lever gripping part 62D forming the front end of the paddle lever 62 is disposed below the motor housing 22. Therefore, workability of the grinder 10 may be improved. That is, suppose that the front end of the paddle lever 62 were rotatably connected to the motor housing 22, then the rear end of the paddle lever 62 would be configured as a gripping part to be gripped by the user. Here, in the grinder 10, the grindstone 53 is attached to the front end. Therefore, when working with the grinder 10, the user may grip the front end side (near the grindstone 53) of the grinder 10, so that the workability of the paddle lever 62 is improved. Further, suppose that the rear end of the paddle lever 62 is configured as a gripping part, then the user would have to operate the paddle lever 62 while gripping the rear end side of the grinder 10, which may reduce the workability of the grinder 10. In contrast, in this embodiment, the rear end of the paddle lever 62 is rotatably connected to the rear housing 26, and the lever gripping part 62D forming the front end of the paddle lever 62 is disposed below the motor housing 22. Therefore, the user may operate the paddle lever 62 while gripping the front end side of the grinder 10. Therefore, the workability of the grinder 10 may be improved. In particular, since the motor housing 22 does not have a wind window such as an intake port, it is possible to prevent the wind window from being closed by gripping during work.

Further, the stopper part 26F of the rear housing 26 extends from the rear housing 26 toward the paddle lever 62 side (lower side), and the engaging part 26F2 protruding to the outer side in the left-right direction is formed at the tip of the stopper part 26F. Further, the stopper insertion part 62J is formed in the paddle lever 62, and the tip of the stopper part 26F is inserted into the stopper insertion part 62J (insertion hole 62J1). Further, the engaged part 62J2 is formed on the stopper insertion part 62J, and the engaging part 26F2 and the engaged part 62J2 are engaged with each other in the up-down direction. In this way, the downward rotation of the paddle lever 62 in the initial position may be restricted with a simple configuration.

Further, the stopper part 26F is sandwiched in the left-right direction by the inner peripheral surface (left-right-direction inner surface) of the insertion hole 62J1 and the engaged part 62J2. Therefore, it is possible to prevent the stopper part 26F from slipping out of the stopper insertion part 62J by the inner peripheral surface of the stopper insertion part 62J. That is, for example, when a downward external force is applied to the lever gripping part 62D of the paddle lever 62, the engaged part 62J2 of the paddle lever 62 presses the engaging part 26F2 to the lower side. At this time, since the engaging part 26F2 protrudes to the outer side in the left-right direction from the stopper part 26F, the pressing force applied to the engaging part 26F2 causes the stopper part 26F to bend and deform to the inner side in the left-right direction. Here, the stopper part 26F is sandwiched in the left-right direction by the inner peripheral surface (left-right-direction inner surface) of the insertion hole 62J1 and the engaged part 62J2. Therefore, when the stopper part 26F attempts to bend and deform, the stopper part 26F comes into contact with the inner peripheral surface of the stopper insertion part 62J, whereby bending and deformation of the stopper part 26F are suppressed. Therefore, the engagement state between the stopper part 26F and the paddle lever 62 may be maintained well.

Further, the stopper part 26F is provided in the rear housing 26, and the stopper insertion part 62J is formed in the paddle lever 62. Therefore, the rigidity of the rear housing 26 may be increased compared with a configuration in which the stopper insertion part 62J (insertion hole 62J1) is formed in the rear housing 26. In addition, dust generated during cutting may be prevented from entering the rear housing 26.

Further, the rear housing 26 is provided with a pair of stopper parts 26F, and the paddle lever 62 is formed with a pair of stopper insertion parts 62J. The pair of stopper insertion parts 62J are disposed side by side in the left-right direction (orthogonal direction orthogonal to the extending direction of the paddle lever 62). In this way, in the engagement state between the engaging part 26F2 of the stopper part 26F and the engaged part 62J2 of the stopper insertion part 62J, the stress acting on the engaging part 26F2 and the engaged part 62J2 may be dispersed to two parts. In this way, the engagement state between the stopper part 26F and the paddle lever 62 may be maintained well while suppressing aging of the engaging part 26F2 and the engaged part 62J2.

Further, the paddle lever 62 is rotatably provided with the off-lock member 66 for blocking or allowing the rotation of the paddle lever 62 at the initial position. The off-lock member 66 is disposed between the pair of stopper insertion parts 62J, and the off-lock member 66 and the pair of stopper insertion parts 62J are disposed side by side in the left-right direction. Specifically, the disposition hole 62M for disposing the off-lock member 66, the bearing part 62N for supporting the off-lock member 66, and the pair of stopper insertion parts 62J are disposed side by side in the left-right direction. In this way, the paddle lever 62 may be divided into a lever body part 62E in which the disposition hole 62M, the bearing part 62N, and the stopper insertion part 62J are formed, and the lever gripping part 62D to be gripped by the user. In this way, the strength of the paddle lever 62 is ensured by increasing the thickness of the lever body part 62E, and the operability of the paddle lever 62 is ensured by widening the area of the lever gripping part 62D, which is relatively thin.

Further, the support part 26L of the surrounding wall 26C of the rear housing 26 is formed with a housing-side inclined surface 26N, and the rotating shaft 62G of the paddle lever 62 is formed with a shaft-side inclined surface 62H. Accordingly, when the rotating shaft 62G is assembled in the support hole 26M, the rotating shaft 62G disposed below the housing-side inclined surface 26N of the rear housing 26 is pushed to the upper side, and the shaft-side inclined surface 62H slides on the housing-side inclined surface 26N, and the peripheral wall 62B of the paddle lever 62 and the surrounding wall 26C of the rear housing 26 are bent and deformed, and the rotating shaft 62G is fitted into the support hole 26M. In this way, the housing-side inclined surface 26N and the shaft-side inclined surface 62H facilitate snap-fitting between the rotating shaft 62G and the support hole 26M. Therefore, the assembly property of the paddle lever 62 to the rear housing 26 may be further improved. In particular, in this embodiment, since the rotation restriction and rotation support of the paddle lever 62 may be performed by the rear housing 26 alone, which is a single member, no special tools are required, and the paddle lever 62 may be assembled to the rear housing 26 in a so-called tool-less and simple way. Further, since the motor housing 22 does not participate in supporting the paddle levers 62, after assembling the rear housing 26 before supporting the paddle lever 62 to the motor housing 22, it is possible to assemble the paddle lever 62 to the rear housing 26 supported by the motor housing 22. In this way, this embodiment is good in assembly property because the degree of freedom in assembly may be ensured.

Further, the control board 82 is accommodated in the rear housing 26. Further, a restricting rib 26P is provided on the inner peripheral surface of the lower part of the rear housing 26, and the restricting rib 26P protrudes to the upper side (the control board 82 side). In this way, the lower part of the inside of the rear housing 26 (the board accommodating part 26A) may be partitioned in the left-right direction by the restricting rib 26P. Specifically, the lower part of the board accommodating part 26A may be partitioned into the wiring accommodating area 26A1 and the lever operating area 26A2 by the restricting rib 26P. In this way, electrical components (in this embodiment, the motor-side lead wires 38A, 38B, and 38C, and the board-side lead wires 40A, 40B, and 40C) disposed in the wiring accommodating area 26A1 at a position spaced apart from the element mounting surface of the control board 82 may be restricted by the restricting rib 26P from moving toward the lever operating area 26A2. Further, the restricting rib 26P is formed with the rear housing 26 as a same piece. Therefore, for example, compared with a configuration in which a separate partition plate is provided on the board holder 28, it is possible to improve the assembly property of the grinder 10 while suppressing an increase in the number of parts.

In addition, the control board 82 is formed in a rectangular plate shape with the front-rear direction as the longitudinal direction, and the restricting rib 26P extends in the front-rear direction (the axial direction of the motor 30) on the lower side of the control board 82. Therefore, the space of the board accommodating part 26A may be partitioned over the longitudinal direction of the control board 82 by the restricting rib 26P.

Further, the rear housing 26 is disposed on the rear side of the motor housing 22 (on one side in the axial direction of the motor 30), and the motor-side lead wires 38A, 38B, and 38C and the board-side lead wires 40A, 40B, and 40C extend in the front-rear direction inside the board accommodating part 26A. The motor-side lead wires 38A, 38B, and 38C and the board-side lead wires 40A, 40B, and 40C are disposed on the right side of the restricting rib 26P. In this way, the motor-side lead wires 38A, 38B, and 38C and the board-side lead wires 40A, 40B, and 40C may be prevented from moving in the left-right direction due to vibration or the like by the restricting ribs 26P. As a result, the motor 30 and the control board 82 may be connected while suppressing the left-right-direction movement of the motor-side lead wires 38A, 38B, and 38C and the board-side lead wires 40A, 40B, and 40C.

Further, the switch 84 for turning on and off the motor 30 is provided on the lower surface of the control board 82, and the switch 84 (the right end thereof) and the restricting rib 26P are disposed to face each other in the up-down direction. Therefore, the motor-side lead wires 38A, 38B, and 38C and the board-side lead wires 40A, 40B, and 40C whose movements are restricted by the restricting rib 26P may be prevented from coming into contact with the switch 84. In this way, for example, malfunction of the switch 84 may be prevented.

Further, the switching element 86 is provided on the lower surface of the control board 82, and the motor-side lead wires 38A, 38B, and 38C, the board-side lead wires 40A, 40B, and 40C, and the switching element 86 are disposed on the right side with respect to the restricting rib 26P and the switch 84. That is, the switching element 86 and the switch 84 are disposed side by side in the left-right direction, and the restricting rib 26P, the motor-side lead wires 38A, 38B, and 38C, and the board-side lead wires 40A, 40B, and 40C are disposed side by side in the left-right direction. Therefore, the movement of the motor-side lead wires 38A, 38B, and 38C and the board-side lead wires 40A, 40B, and 40C to the left side (the lever operating area 26A2 side) may be restricted by the restricting rib 26P and the switching element 86. In this way, contact of the motor-side lead wires 38A, 38B, and 38C and the board-side lead wires 40A, 40B, and 40C with the switch 84 may be effectively suppressed.

Further, the tip (lower end) of the switching element 86 and the tip (upper end) of the restricting rib 26P overlap when viewed from the left-right direction. Therefore, the switching element 86 and the restricting rib 26P may form a so-called labyrinth structure between the switching element 86 and the restricting rib 26P. Therefore, the movement of the motor-side lead wires 38A, 38B, and 38C and the board-side lead wires 40A, 40B, and 40C to the left side (the lever operating area 26A2 side) may be more effectively restricted. Therefore, contact of the motor-side lead wires 38A, 38B, and 38C and the board-side lead wires 40A, 40B, and 40C with the switch 84 may be more effectively suppressed.

Further, the switch operating part 62R of the paddle lever 62 is inserted through the insertion hole 26H of the rear housing 26 and disposed in the lever operating area 26A2. The insertion hole 26H is disposed adjacent to the left side of the restricting rib 26P. That is, the switch operating part 62R is disposed adjacent to the left side of the restricting rib 26P. Therefore, the motor-side lead wires 38A, 38B, and 38C and the board-side lead wires 40A, 40B, and 40C may be prevented from contacting the switch operating part 62R by the restricting rib 26P. In this way, the influence of the motor-side lead wires 38A, 38B, and 38C and the board-side lead wires 40A, 40B, and 40C on the operation of the switch operating part 62R may be suppressed, while the motor-side lead wires 38A, 38B, and 38C the board-side leads wires 40A, 40B, and 40C and the switch operating part 62R may be disposed side by side in the left-right direction.

In this embodiment, the rear housing 26 is provided with the stopper part 26F, and the paddle lever 62 is formed with the stopper insertion part 62J. Alternatively, the paddle lever 62 may be provided with the stopper part 26F, and the rear housing 26 may be provided with the stopper insertion part 62J. Furthermore, in this embodiment, the switch 84 is configured to be accommodated in the rear housing 26 while being supported by the motor housing 22. However, the switch 84 may be configured to be supported and housed in another accommodating part, and components accommodated in the undivided part of the housing (rear housing 26) to which the paddle lever 62 is assembled may be changed as desired. That is, according to the disclosure, an undivided paddle lever formed with a rotating shaft is snap-fitted to an undivided housing, so what is accommodated in the housing may be changed as desired. Further, although the motor housing 22 and the rear housing 26 are configured as separate parts in this embodiment, they may be integrated. That is, the housing that accommodates the motor and the like may be configured as a single piece, undivided part, and the paddle lever 62 may be snap-fitted to the housing.

Further, in this embodiment, an insertion hole 62J1 of the stopper insertion part 62J in the paddle lever 62 is formed to penetrate through the stopper insertion part 62J. Alternatively, the stopper insertion part 62J may be formed in a bottomed concave shape that opens to the upper side.

Further, in this embodiment, the support part 26L of the rear housing 26 is formed with the housing-side inclined surface 26N, and the rotating shaft 62G of the paddle lever 62 is formed with the shaft-side inclined surface 62H, but one of the housing-side inclined surface 26N and the shaft-side inclined surface 62H may be omitted.

The invention claimed is:
1. A work machine comprising:
a motor;
a control part comprising a control board connected to the motor;
a housing comprising a first housing that accommodates the motor and a second housing that accommodates the control board; and
a restricting part provided on an inner peripheral surface of the second housing, protruding toward the control board, and restricting a movement of an electrical component connected to the control board,
wherein the control board and the restricting part extend in an axial direction of the motor,
wherein the second housing is formed in a cylindrical shape and the restricting part extends on the inner peripheral surface of the second housing along the axial direction of the motor, and
wherein a direction normal to a surface of the control board on which the electrical component is connected is defined as a thickness direction of the control board, and a direction orthogonal to both the thickness direction of the control board and the axial direction of the motor is defined as an orthogonal direction, the restricting part is disposed on one side in the thickness direction of the control board, the second housing is disposed on one side in the axial direction of the motor with respect to the first housing, a wiring connecting the control board and the motor configures the electrical component and extends in the axial direction of the motor inside the second housing, and the wiring is disposed on one side in the orthogonal direction with respect to the restricting part, and a movement of the wiring to another side in the orthogonal direction is restricted by the restricting part.

2. The work machine according to claim 1, wherein a switch for turning on and off the motor is provided on one side surface of the control board, and the switch and the restricting part are disposed to face each other in the thickness direction of the control board.

3. The work machine according to claim 2, wherein a switching element for controlling the motor is provided on the one side surface of the control board, and the wiring and the switching element are disposed on the one side in the orthogonal direction with respect to the restricting part and the switch.

4. The work machine according to claim 1, further comprising:

a switch for turning on and off the motor;

a paddle lever connected to the housing; and a transmitting part being moved by an operation of the paddle lever, wherein the switch is operated by the transmitting part operating in the another side in the orthogonal direction with respect to the restricting part.

5. The work machine according to claim 4, wherein the transmitting part includes an operating protrusion provided on the paddle lever, wherein the paddle lever is rotatable around a rotation axis, and the operating protrusion is positioned offset from a center of the paddle lever in an extending direction of the rotation axis of the paddle lever.

* * * * *